US 8,311,279 B2

(12) United States Patent
Quarfordt et al.

(10) Patent No.: US 8,311,279 B2
(45) Date of Patent: Nov. 13, 2012

(54) SYSTEM AND METHOD FOR IMPROVED IMAGE ANALYSIS THROUGH GAZE DATA FEEDBACK

(75) Inventors: Pernilla Quarfordt, Los Altos, CA (US); Jacob Biehl, San Jose, CA (US); Gene Golovchinsky, Menlo Park, CA (US)

(73) Assignee: Fuji Xerox Co., Ltd., Tokyo (JP)

( * ) Notice: Subject to any disclaimer, the term of this patent is extended or adjusted under 35 U.S.C. 154(b) by 83 days.

(21) Appl. No.: 12/711,003

(22) Filed: Feb. 23, 2010

(65) Prior Publication Data

US 2011/0206283 A1   Aug. 25, 2011

(51) Int. Cl.
G06K 9/00 (2006.01)
G06K 9/46 (2006.01)
G06K 9/66 (2006.01)
G06K 9/68 (2006.01)
G06K 9/36 (2006.01)

(52) U.S. Cl. ........ 382/103; 382/100; 382/117; 382/165; 382/170; 382/190; 382/192; 382/195; 382/201; 382/218; 382/288

(58) Field of Classification Search .................. None
See application file for complete search history.

(56) References Cited

U.S. PATENT DOCUMENTS

| 7,857,452 | B2 * | 12/2010 | Martinez-Conde et al. ... 351/246 |
| 7,881,493 | B1 * | 2/2011 | Edwards et al. ............. 382/103 |
| 8,108,800 | B2 * | 1/2012 | Kantamneni ................ 715/863 |
| 2008/0062383 | A1 | 3/2008 | Endrikhovski et al. |

FOREIGN PATENT DOCUMENTS

JP   2007/319327 A   12/2007

OTHER PUBLICATIONS

Nodine et al., Using eye movements to study visual search and to improve tumor detection, RadioGraphics, vol. 7, No. 6, 1987, pp. 1241-1250.*
Santella et al., Robust clustering of eye movement recordings for quantification of visual interest, Proceeding ETRA '04 Proceedings of the 2004 symposium on Eye tracking research & applications, pp. 27-34.*

(Continued)

Primary Examiner — Tom Y Lu
Assistant Examiner — Thomas Conway
(74) Attorney, Agent, or Firm — Morgan, Lewis & Bockius LLP

(57) ABSTRACT

The image analysis system includes a processor and memory and displays an image to a first user. The image analysis system tracks gaze of the first user and collects initial gaze data for the first user. The initial gaze data includes a plurality of gaze points. The image analysis system identifies one or more ignored regions of the image based on a distribution of the gaze data within the image; and displays at least a first subset of the image. The first subset of the image is selected so as to include a respective ignored region of the one or more ignored regions and the first subset of the image is displayed in a manner that draws attention to the respective ignored region. In some embodiments, the ignored region is visually emphasized within the image. In some embodiments, only the first subset of the image is displayed.

23 Claims, 13 Drawing Sheets

OTHER PUBLICATIONS

Antonelli, M., et al., "Lung Nodule Detection Using Eye-Tracking," Image Processing, 2007, ICIP 2007, IEEE International Conference on Sep. 16-Oct. 19, 2007, vol. 2, pp. 457-460.

Goddard, P., et al., Short Communication: "Error in Radiology," The British Journal of Radiology, 74, Oct. 2001, pp. 949-951.

Leslie, A., et al., "The Influence of Clinical Information on the Reporting of CT by Radiologists," The British Journal of Radiology, 73, Oct. 2000, pp. 1052-1055.

Markus, J., et al., Double-Contrast Barium Enema Studies: "Effect of multiple Reading on Perception Error," Radiology 1990, vol. 175, pp. 155-156.

Mello-Thoms, C., et al., "What Attracts the Eye to the Location of Missed and Reported Breast Cancer?," Eye Tracking Research Application, Proceedings of the 2002 Symposium on Eye Tracking Research & Applications, 2002, pp. 111-117.

Nodine, C., et al., "Using Eye Movements to Study Visual Search and to Improve Tumor Detection," RadioGraphics, Nov. 1987, vol. 7, No. 6, Monograph, pp. 1241-1250.

Peldschus, K., et al., Computer-Aided Diagnosis as a Second Reader: "Spectrum of Findings in CT Studies of the Chest Interpreted as Normal," downloaded from www.chestjournal.org on May 11, 2009, American College of Chest Physicians, pp. 1517-1523.

\* cited by examiner

SYSTEM AND METHOD FOR IMPROVED IMAGE ANALYSIS THROUGH GAZE DATA FEEDBACK

TECHNICAL FIELD

The disclosed embodiments relate generally to improving the accuracy of visual searches of images and more particularly, to improving target acquisition in visual searches of images.

BACKGROUND

Human-based image analysis is a commonly performed task in many contemporary professions. For instance, radiologists and other medical professionals frequently examine medical images to diagnose and treat patients, airport security agents scan x-rays of luggage for prohibited items, and factory workers perform visual inspection of goods to assure quality. In these tasks, the human examiner must combine their knowledge of the domain and a high degree of mental concentration within a short amount of time to classify or interpret the images. While there have been many advances both in the technology used to create images and in the training of human examiners, many image analysis tasks are still prone to significant error. For example, some studies have shown that radiological image examination still has error rates nearing twenty percent for clinically significant errors. Moreover, even with examination of an image by multiple users the error rate is often still quite high.

SUMMARY

As such, there is a need for a more formal, structured human-based image analysis methodology that ensures full examination of all relevant regions of an image so as to reduce error and improve target identification in visual search tasks.

The above deficiencies and other problems associated with identifying targets within an image while performing a visual search task are reduced or eliminated by the disclosed system and method of performing structured image analysis that is both systematic and adaptive to a user's search behavior. In general, the system and method provide a more structured image examination process. More specifically, the system and method increases the total coverage of examination while reducing redundant examination with the goal of reducing the overall number of false negatives, in particular those false negatives in regions of the image that the examiner did not view or evaluate.

In accordance with one aspect of the system and method, an image analysis system displays an image to a first user. The image analysis system further tracks gaze of the first user; and collects initial gaze data for the first user. The initial gaze data includes a plurality of gaze points. The image analysis system also identifies one or more ignored regions of the image based on a distribution of the gaze data within the image and displays at least a first subset of the image. In some embodiments the first subset is displayed to the first user. In some embodiments the first subset is displayed to a second user that is distinct from the first user. The first subset of the image is selected so as to include a respective ignored region of the one or more ignored regions and the first subset of the image is displayed in a manner that draws attention to the respective ignored region.

In other words, in accordance with some embodiments, the system and method implements a two phase structured image search methodology that consists of an initial phase of free search followed by a second phase designed to help the user to better cover the image. In some embodiments, this second phase includes dividing the image into smaller ignored regions and displaying only a subset of the image that includes one of the ignored regions. In some embodiments, this second phase includes blocking out attended regions and displaying the portion of the image that does not include the blocked out regions, or of a combination of these techniques. In some embodiments, this second phase includes redisplaying the image and visually emphasizing one or more ignored regions within the image. It should be understood that this system and method is not domain dependent, and it can be applied to many domains, including security images, satellite images, maps, astronomical images, and scientific visualizations.

An additional benefit of the embodiments described herein is that, for at least some visual search tasks, the percentage of true positive identifications are increased over known visual search methods, while the percentage of false negative identifications are reduced over known visual search methods.

BRIEF DESCRIPTION OF THE DRAWINGS

Like reference numerals refer to corresponding parts throughout the drawings.

DESCRIPTION OF EMBODIMENTS

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known method, procedures, components, circuits and networks have not been described in detail so as not to unnecessarily obscure aspects of the embodiments.

Figure 1:
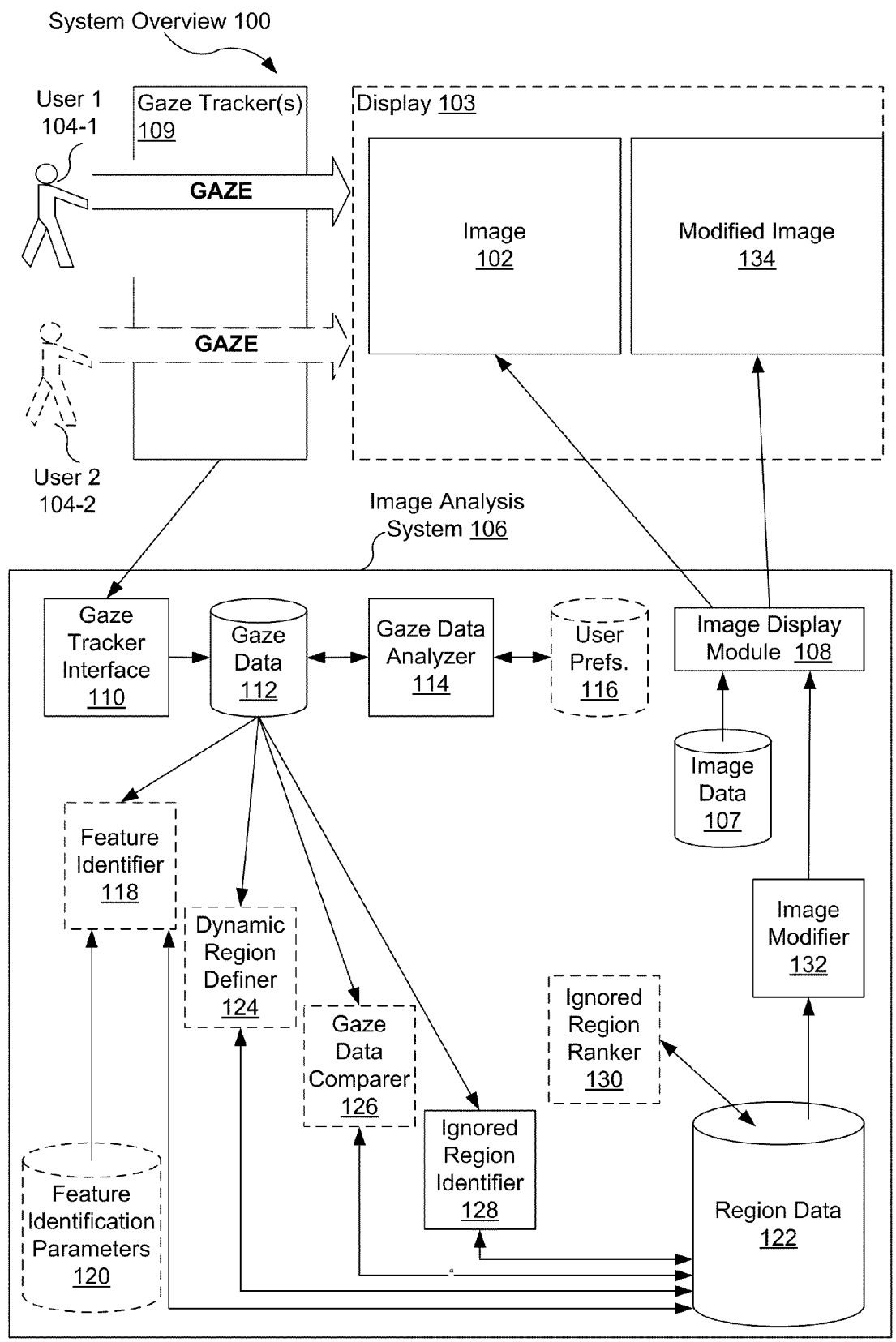
FIG. 1 is a block diagram illustrating an overview a system for identifying ignored regions of an image based on gaze data in accordance with some embodiments.

FIG. 1 is a block diagram illustrating an overview 100 of a system for identifying ignored regions of an image based on gaze data in accordance with some embodiments. An image 102 is displayed on a display 103 to one or more users (e.g., 104-1 and/or 104-2 in FIG. 1) by an image analysis system 106. In some embodiments, the image data is retrieved from a data structure for image data 107 that is retrieved by an image display module 108 and sent to the display 103 for display to the user. The gaze of the user(s) 104 is detected by one or more gaze trackers 109. In some embodiments, the gaze tracker(s) 109 are an integrated part of the image analysis system 106. In some embodiments the gaze tracker(s) 109 are stand alone devices or are integrated with the display 103 and transmit gaze data back to the image analysis system 106. It should be understood that the image analysis system 106 is a computing device. In accordance with some embodiments, a computing device is any device capable of performing computations based on instructions stored in a computer readable storage medium, for example a computing device may be a workstation system, a personal computer, a personal digital assistant, a cell phone, or any other stationary or mobile computer.

The image analysis system 106 receives gaze data from the gaze tracker 109. A gaze tracker interface 110 receives the gaze data and stores the gaze data in a data structure for gaze data 112 that is associated with the image analysis system 106. A gaze data analyzer 114 analyzes the gaze data. In some embodiments, the gaze data analyzer generates groupings of the gaze data; additionally, in some embodiments, the groupings of gaze data are based on fixations that are identified within the gaze data, as described in greater detail below with reference to FIGS. 3A-3J. In some embodiments, the groupings are determined based at least in part on user preferences that are retrieved from a data structure for user preferences 116. Groupings of gaze data that are generated by the gaze data analyzer 114 are stored in the data structures for gaze data 112. In other words, in some embodiments, the gaze data 112 includes both unprocessed (i.e., raw) gaze data and processed gaze data. In some embodiments the gaze data analyzer 114 also controls other modules and processes within the image analysis system 106 and directs further processing of the gaze data to generate the modified image, as discussed in greater detail below. In other embodiments, the image analysis system 106 includes a dedicated master control module for controlling the various modules and processes described herein.

In some embodiments, the gaze data and gaze data groupings that are stored in the data structures for the gaze data 112 are used by one or more modules to identify ignored regions of the image. In some embodiments, the gaze data analyzer 114 controls the ignored region identification processes. A feature identifier 118 identifies relevant features within the image. In some embodiments, the features are identified based on feature identification parameters 120 and/or the gaze data 112 (e.g., the processed and/or unprocessed gaze data). The identified features are stored in data structures for region data 122.

In some embodiments, a dynamic region definer 124 uses the gaze data 112 to dynamically define regions of the image, as described in greater detail below. The locations of the defined regions are stored as region data 122. In some embodiments, the gaze data 112 includes gaze data from multiple users, and the image analysis system 106 includes a gaze comparer 126 for comparing gaze data from respective ones of the multiple users. In some embodiments, this comparison data is stored in the data structures for the region data 122 and is subsequently used to determine how to redisplay the image to one or more of the multiple users, as described in greater detail below. The image analysis system 106 also includes an ignored region identifier 128 that is used to identify regions of the image that were not inspected by the user sufficiently carefully (e.g., regions that do not include distributions of gaze data above a threshold, as described in greater detail below). Identified ignored regions are indicated in the region data 122. In some embodiments, once the ignored regions are identified, an ignored region ranker 130 ranks the ignored regions based on the region data 122 (e.g., based on the detected features, the dynamically identified regions, the comparison gaze data, and/or the locations of identified ignored regions), the rankings are also stored as region data 122. It should be understood that, in accordance with some embodiments, the data that is stored by various modules in region data 122 is also used by various other modules (e.g., Feature Identifier 118, Dynamic Region Definer 124, Gaze Data Comparer 126, Ignored Region Identifier 128 and/or Ignored Region Ranker 130) to generate results as described above. For example, in some embodiments the gaze data comparer 126 uses the dynamically defined regions stored in the region data 122 when comparing data for the multiple users.

The image analysis system 106 also includes an image modifier 132 that modifies the image (e.g., the originally displayed image 102) so as to draw attention to an ignored region within the original image. In some embodiments, the modified image 134 is passed to the image display module 108 and is displayed to one or more of the users (e.g., the first user 102-1 and/or the second user 102-2). In some embodiments, the modified image 134 includes only a subset of the original image 102. In some embodiments, one or more ignored regions are visually emphasized within the modified image 134 so as to draw attention to the one or more ignored regions, as described in greater detail below.

In other words, in some embodiments, an original image 102 is displayed to one or more users 104, gaze data is collected for at least one of the users 104 and a modified image 134 that has been modified so as to draw attention to regions of the image that were initially ignored by the one or more users 104 is displayed to one or more of the users 104 by the image analysis system 106. In one embodiment, the modified image 134 is displayed to the user for whom the gaze data was initially collected, so as to provide feedback directly to the user about regions of the original image 102 that were ignored by the user the first time the image was viewed.

Attention is now directed towards FIG. 2, which shows an embodiment of the image analysis system 106 as a computing device that implements the methods described below and includes one or more processing units (CPU's) 202, one or more network or other communications interfaces 204, memory 206, and one or more communication buses 208 for interconnecting these components. The communication buses 208 may include circuitry (sometimes called a chipset) that interconnects and controls communications between system components. The image analysis system 106 may optionally include a user interface 210. In some embodiments, the user interface 210 includes a display device 103 and/or a keyboard/mouse 214, but other configurations of user interface devices may be used as well. The image analysis system 106 optionally includes a gaze tracker 109 or receives data from a gaze tracker 109. In some embodiments, a gaze tracker 109 includes one or more sensors configured to track eye movements of a user and convert the eye movements to gaze points on the display 103. In some embodiments, the gaze tracker 109 communicates with the image analysis system 106 while gaze points are being captured by the gaze tracker 109. In other embodiments, the gaze tracker 109 communicates with the image analysis system after the gaze data has been captured. In some embodiments, the gaze tracker 109 is independent from the image analysis system 106 and gaze data is transferred from the gaze tracker 109 to the image analysis system 106 via a wired or wireless interface. Memory 206 of the image analysis system 106 may include high speed random access memory and may also include non-volatile memory, such as one or more magnetic or optical storage disks, flash memory devices, or other non-volatile solid state storage devices. The high speed random access memory may include memory devices such as DRAM, SRAM, DDR RAM or other random access solid state memory devices. Memory 206 may optionally include mass storage that is remotely located from CPU's 202. Memory 206, or alternatively the non-volatile memory device(s) within memory 206, includes a computer readable storage medium. Memory 206 or a computer readable storage medium within memory 206 stores the following elements, or a subset of these elements, and may also include additional elements:

an operating system 216 that includes procedures for handling various basic system services and for performing hardware dependent tasks;

a network communication module (or instructions) 218 that is used for connecting the image analysis system 106 to other computing devices via the one or more communications network interfaces 204 and one or more communications networks, such as the Internet, other wide area networks, local area networks, metropolitan area networks, and so on;

applications 220, which include one or more of:
  an image display module 108, for displaying images on the display device 103;
  a gaze tracker interface 110, for receiving input from the gaze tracker 109;
  a gaze data analyzer 114, for processing the gaze data received from the gaze tracker 109, in some embodiments, the gaze data analyzer 114 also includes a fixation identifier 222 for identifying gaze fixations from the gaze points and/or a grouping identifier 224 for identifying gaze groupings from the raw gaze data or from the gaze fixations identified by the fixation identifier 222;
  optionally, a feature identifier 118, for identifying important features in the image;
  optionally, a dynamic region identifier 124, for dynamically identifying regions of the image based on the gaze data;
  optionally, a gaze data comparer 126, for comparing gaze data from respective users;
  an ignored region identifier 128, for identifying respective ignored regions within the image based on distributions of the gaze data;
  optionally, an ignored region ranker 130, for ranking respective ignored regions; and
  an image modifier 132, for modifying an original image (e.g., 102 in FIG. 1) so as to draw attention to ignored regions of the image (e.g., by visually emphasizing the ignored regions and/or selecting a subset of the image that includes an ignored region to display to the user);

data 226, which includes one or more of:
  image data 107, including original images, modified images and other data for display to the user;
  gaze data 112, which includes a plurality of gaze points, in some embodiments the gaze data 112 includes gaze data for a plurality of users (e.g., user 1 gaze data 228 and user 2 gaze data 230), in some embodiments the gaze data includes unprocessed gaze data, in some embodiments the gaze data includes processed gaze data (e.g., gaze groupings determined by the gaze analyzer 114);
  user preferences 116, for customizing the image analysis system 106 to individual users;
  feature identification parameters 120, for customizing the image analysis for a respective image based on the type of features in the image; and
  region data 122, for storing information generated by the image analysis system 106, such as region location data 232, region gaze distribution data 234, region ranking data 236 and/or feature data 238.

Figure 2:
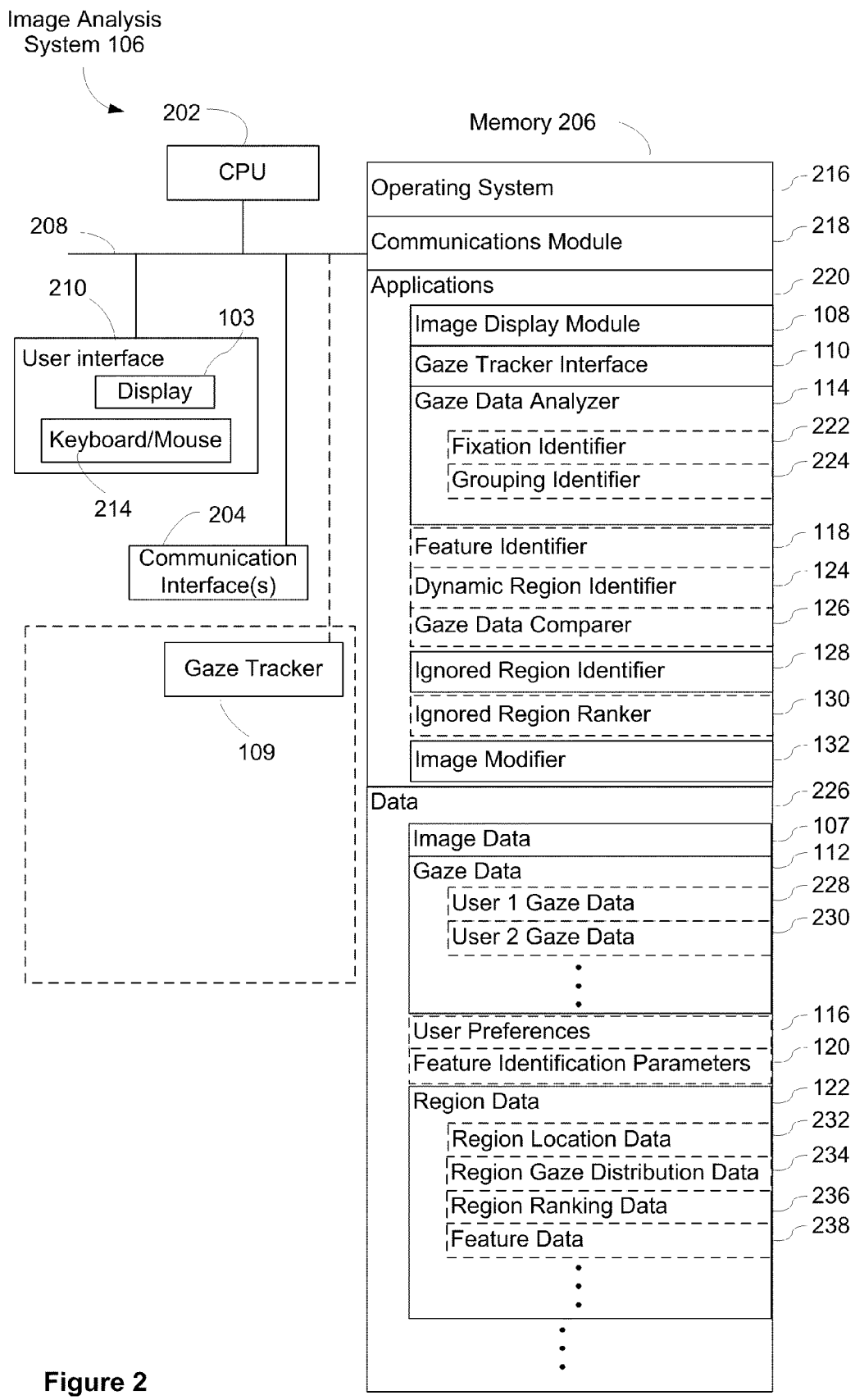
FIG. 2 is a block diagram illustrating an image analysis system implemented as a computing device in accordance with some embodiments.

It should be understood that each of the above identified elements in FIG. 2 may be stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 206 may store a subset of the modules and data structures identified above. Furthermore, memory 206 may store additional modules and data structures not described above. Additionally, while the image analysis system 106 is described above as embodied in a computing device, it should be understood that in some embodiments the image analysis system 106 is implemented as a plurality of interconnected computing device, and the various functions, modules and data described above are divided between the plurality of interconnected computing systems.

Figure 3A:
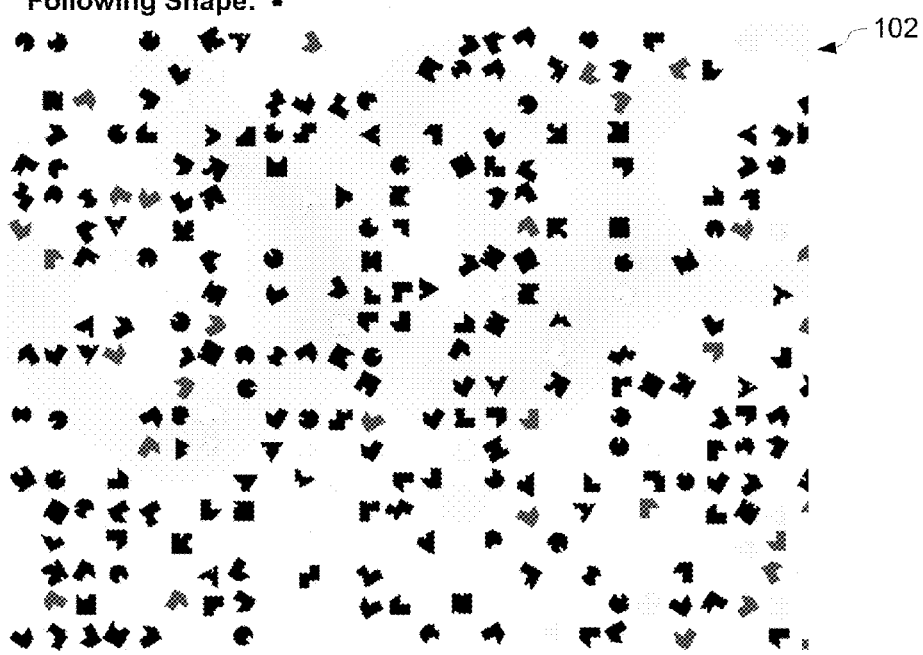
FIGS. 3A-3J are diagrams including examples of displaying an image, collecting gaze data for the image, identifying ignored regions based on the gaze data and displaying a modified image based on the identified ignored regions in accordance with some embodiments.

Attention is now directed towards FIGS. 3A-3J, which are diagrams including examples displaying an original image (e.g. image 102 in FIG. 3A), collecting gaze data, identifying ignored regions and displaying a modified image (e.g., image 134 in FIGS. 3D, 3F, and 3G-3H) in accordance with some embodiments. In FIG. 3A, an exemplary image analysis task is displayed. In this task, an original image 102 is displayed to the user and the image analysis task is to identify shapes within the image with a predefined shape 302. It should be understood that this image analysis task is merely exemplary and is used for illustrative purposes only, it should be understood that the system and methods for structure image analysis apply analogously to any image analysis task in a broad class of image analysis tasks where a human user is asked to identify features or patterns within an image (e.g., identifying tumors in an x-ray image, identifying military targets in aerial photos, identifying structural flaws in an image of a physical structure).

Figure 3B:
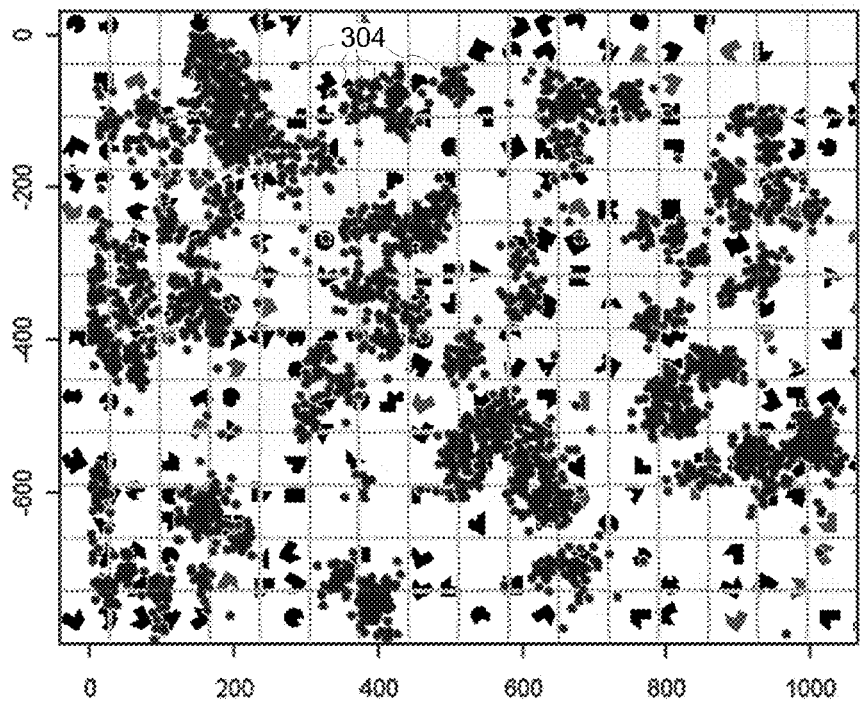

FIG. 3B illustrates a plurality of gaze points 304 generated by a gaze tracker (e.g., 109 in FIGS. 1-2) by detecting the movement of a user's eyes while the image is displayed on the display (e.g., as illustrated in FIG. 3A). In some embodiments, the gaze points each indicate a location of the user's gaze within the image at a particular point in time, as described in greater detail below.

Figure 3C:
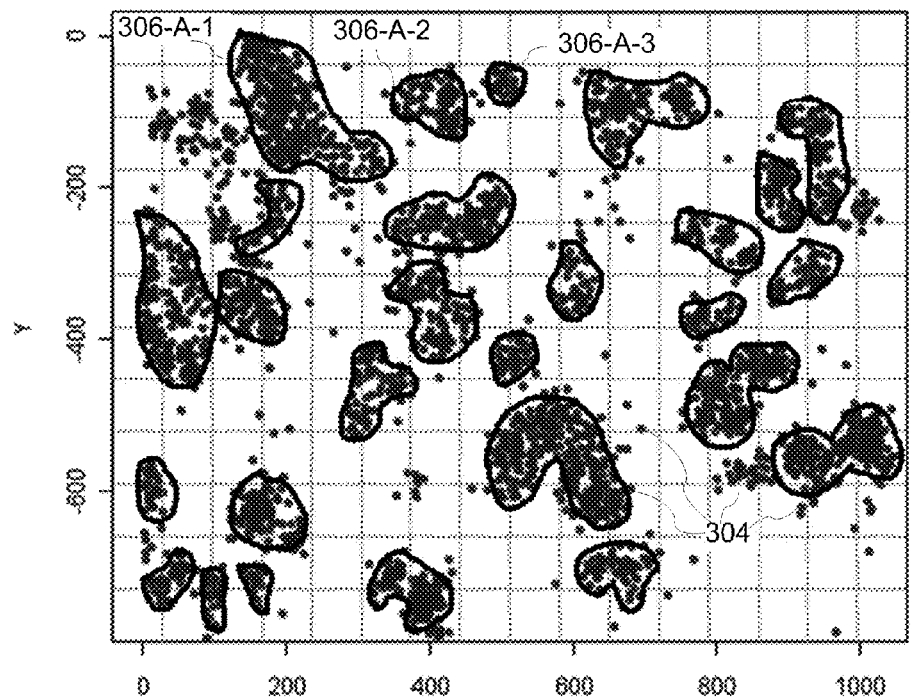

FIG. 3C illustrates groupings (e.g., groupings 306-A) of gaze points that are generated based on the raw gaze data. In other words, in this embodiment, gaze groupings are identified by identifying regions of the image that include gaze points with a sufficient density, as described in greater detail below.

Figure 3D:
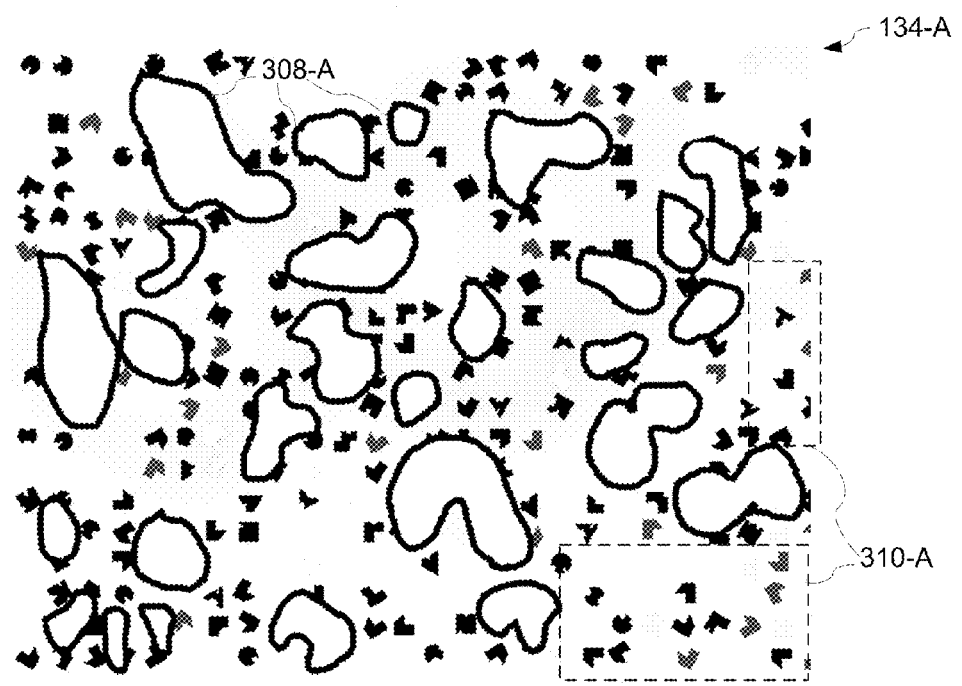

FIG. 3D illustrates displaying a modified image 134-A by redisplaying the image while blocking attended regions (e.g., regions 308-A) and continuing to display ignored regions 310. In this embodiment, where the attended regions (e.g., regions 308-A) are determined based on locations of the identified gaze groupings (e.g., 306-A in FIG. 3C), as described in greater detail below.

Figure 3E:
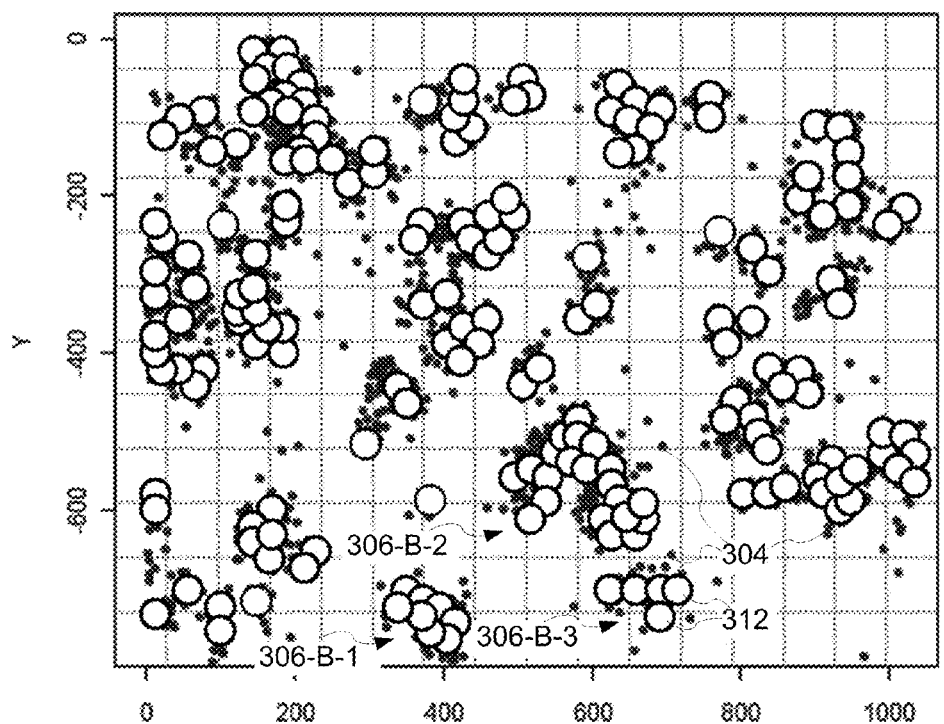

FIG. 3E illustrates identifying gaze fixations 312 based on the detected gaze points, as described in greater detail below. In this embodiment, gaze groupings are subsequently determined by combining multiple gaze fixations (e.g., fixations 312 in FIG. 3E) into groupings (e.g., 306-B in FIG. 3E). In other words, in some embodiments, the image analysis system 106 first determines a plurality of gaze fixations based on temporal and spatial proximity of gaze points and then groups the fixations together based on proximity of the fixations to each other to define gaze groupings, as described in greater detail below.

Figure 3F:
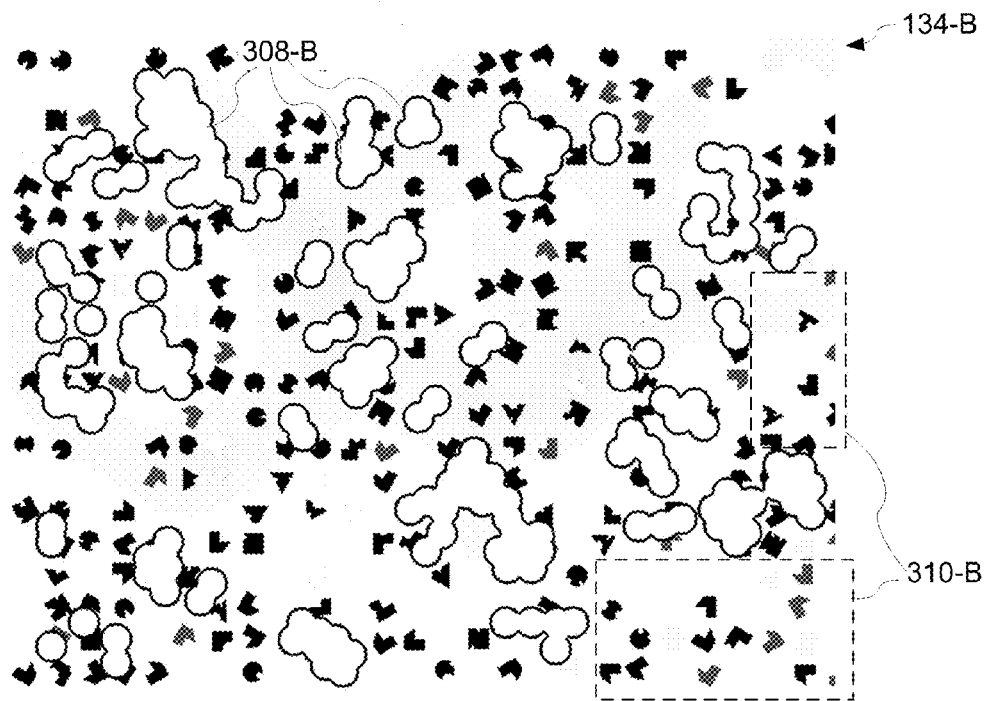

FIG. 3F illustrates displaying a modified image 134-B by redisplaying the image while blocking attended regions (e.g., regions 308-B) and continuing to display ignored regions (e.g., regions 310-B). In this embodiment, the attended regions 308 are determined based on locations of the identified gaze groupings (e.g., 306-B in FIG. 3E).

Figure 3G:
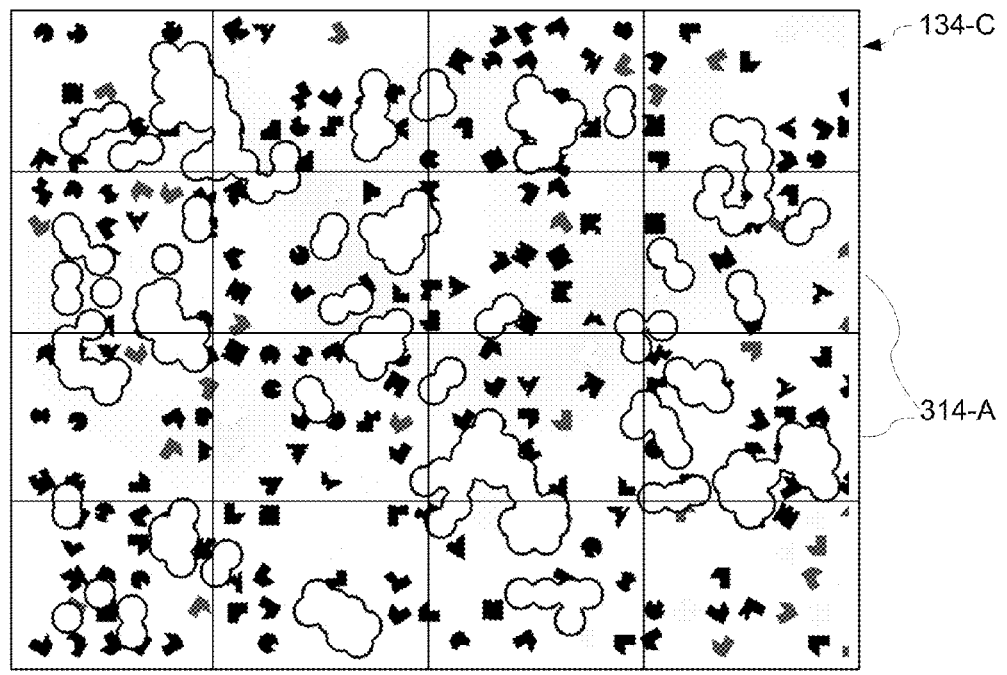

FIG. 3G illustrates a modified image 134-C where a plurality of attended regions 308-B have been blocked, and the image has a plurality of predefined regions 314-A. In FIG. 3G, the predefined regions are a 4×4 grid of rectangular regions. However, it should be understood that this is an illustrative example, and any predefined arrangement of regions could be used without departing from the scope of the presently disclosed system and method.

Figure 3H:
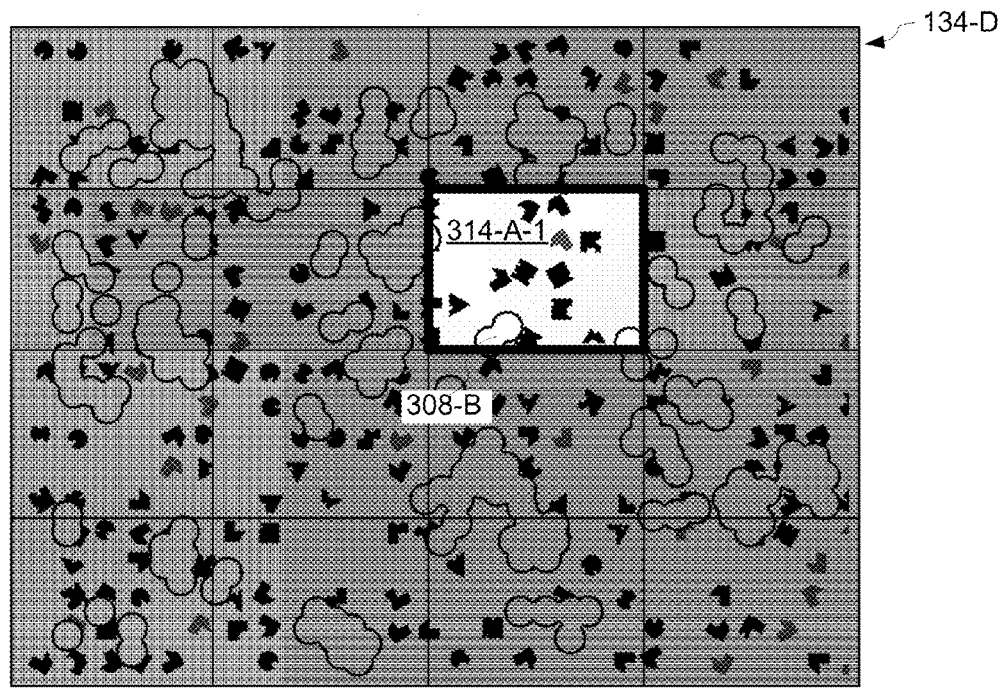

FIG. 3H illustrates a modified image 134-D that has been modified so as to visually emphasize a respective region 314-A-1 of the plurality of regions 314-A. In this example, the respective region is emphasized by reducing the emphasis of the other regions of the images (e.g., by shading the other regions slightly). However, it should be understood that this is merely an illustrative example, and any method of highlighting one or more respective regions could be used without departing from the scope of the present system or method. Additionally, while the attended regions of the image (e.g., 308-B in FIG. 3H) have been blocked from display in the respective region 314-A-1 in this example, it should be understood that, in some embodiments the attended regions are not blocked, and the entire region 314-A-1 is displayed without any attended regions blocked. Moreover, in some embodiments, attended regions are simply defined as predefined regions that include a number of gaze points above a predefined threshold, and thus attended regions are respective ones of the regions 314-A that include distributions of gaze data above a threshold.

Figure 3I:
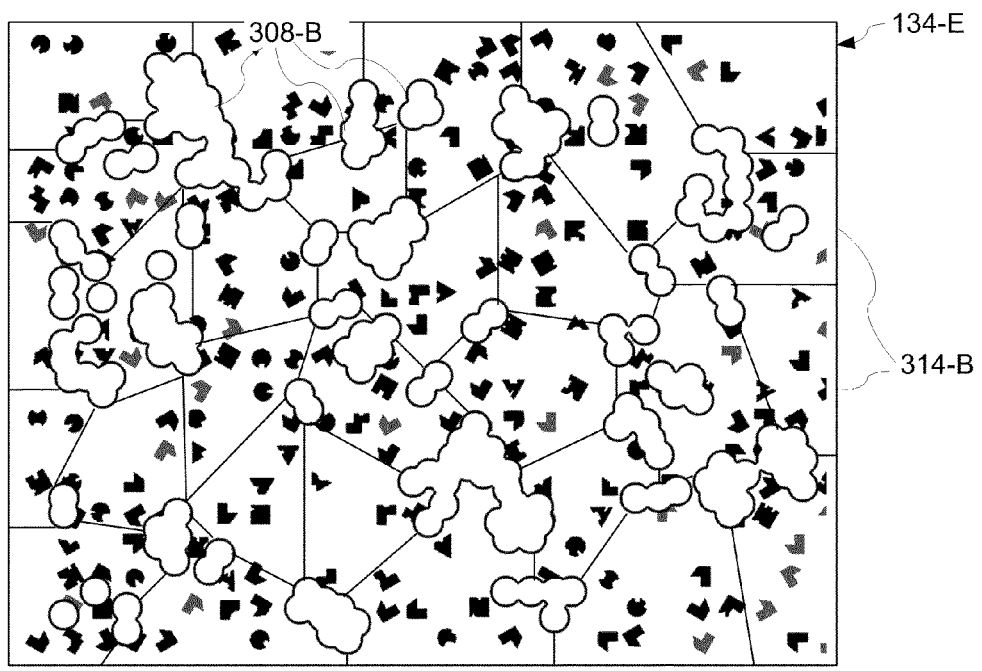

FIG. 3I illustrates a modified image 134-E where a plurality of attended regions 308-B have been blocked and the image has a plurality of dynamically defined regions 314-B. In FIG. 3I, the dynamically defined regions are defined so as to enclose regions of the image that are in between the attended regions of the image. However, it should be understood that this is an illustrative example, and any dynamic arrangement of regions could be used without departing from the scope of the presently disclosed system and method.

Figure 3J:
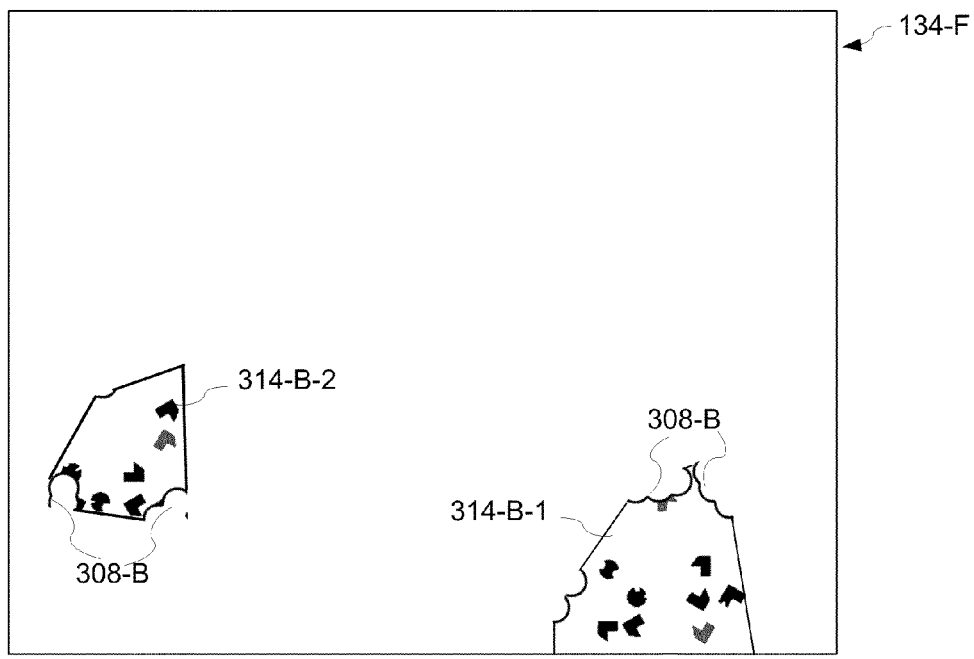
Figure 4A:
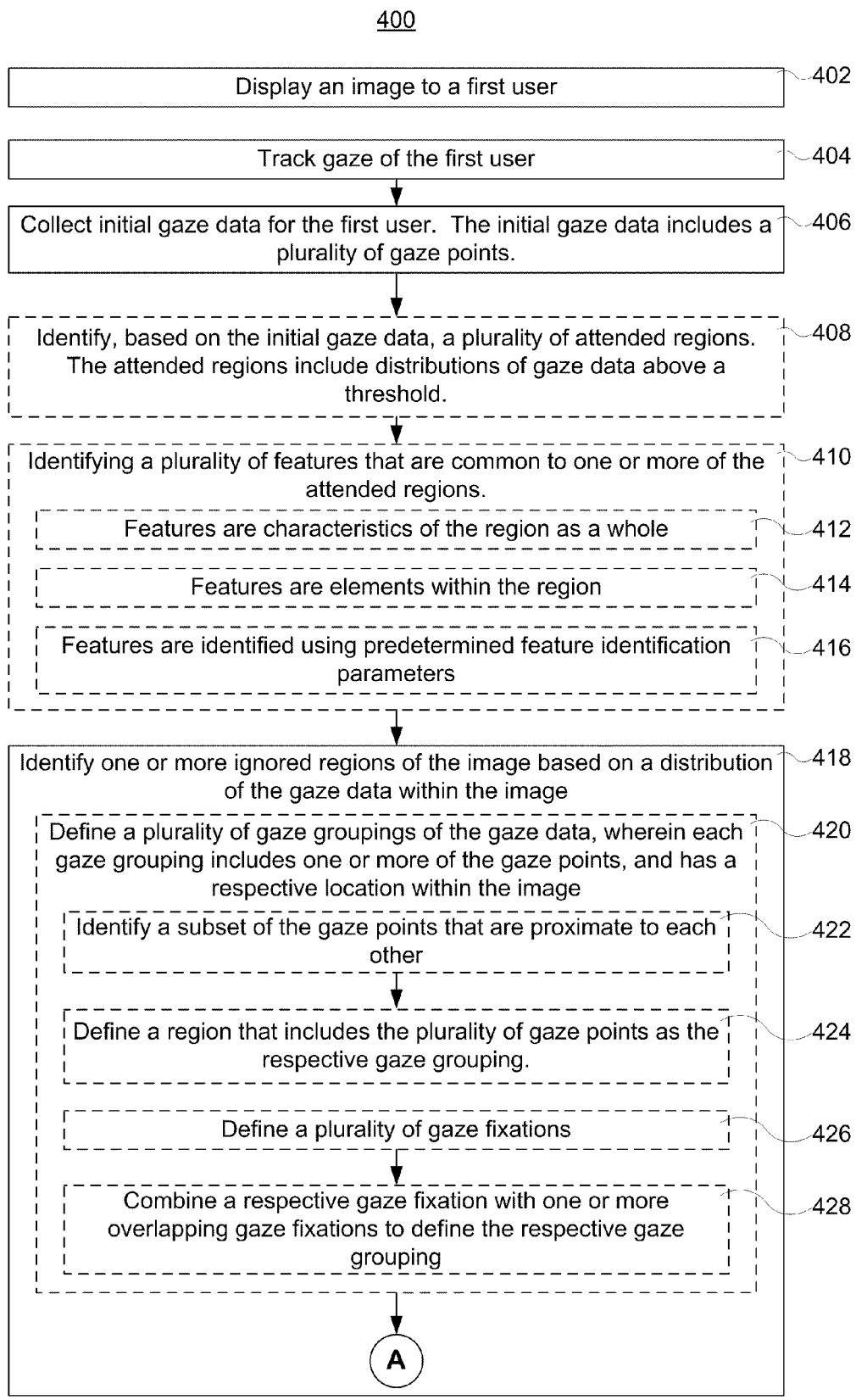
FIGS. 4A-4F are flow charts illustrating a method for identifying ignored regions of an image based on gaze data in accordance with some embodiments.
Figure 4B:
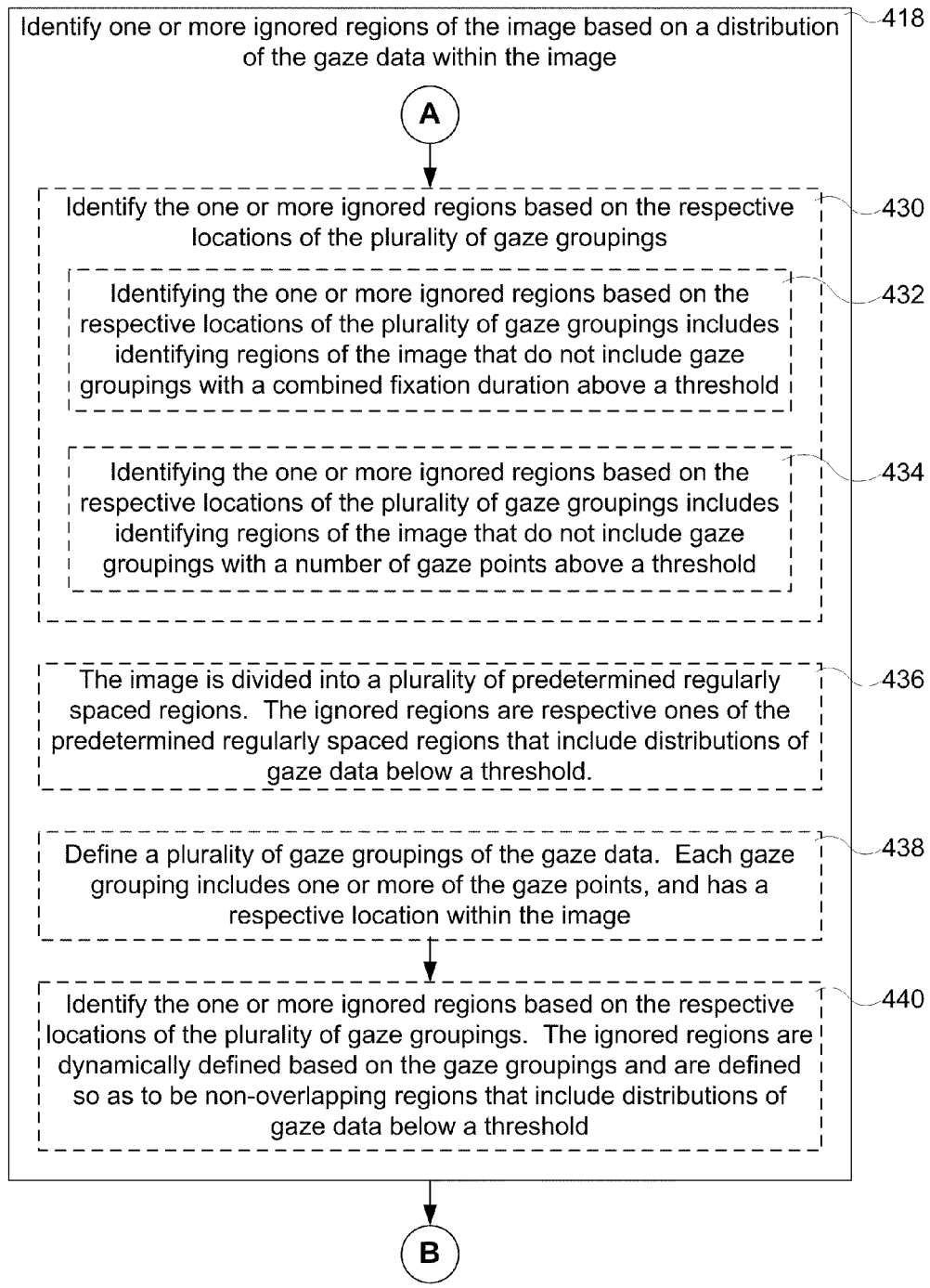
Figure 4C:
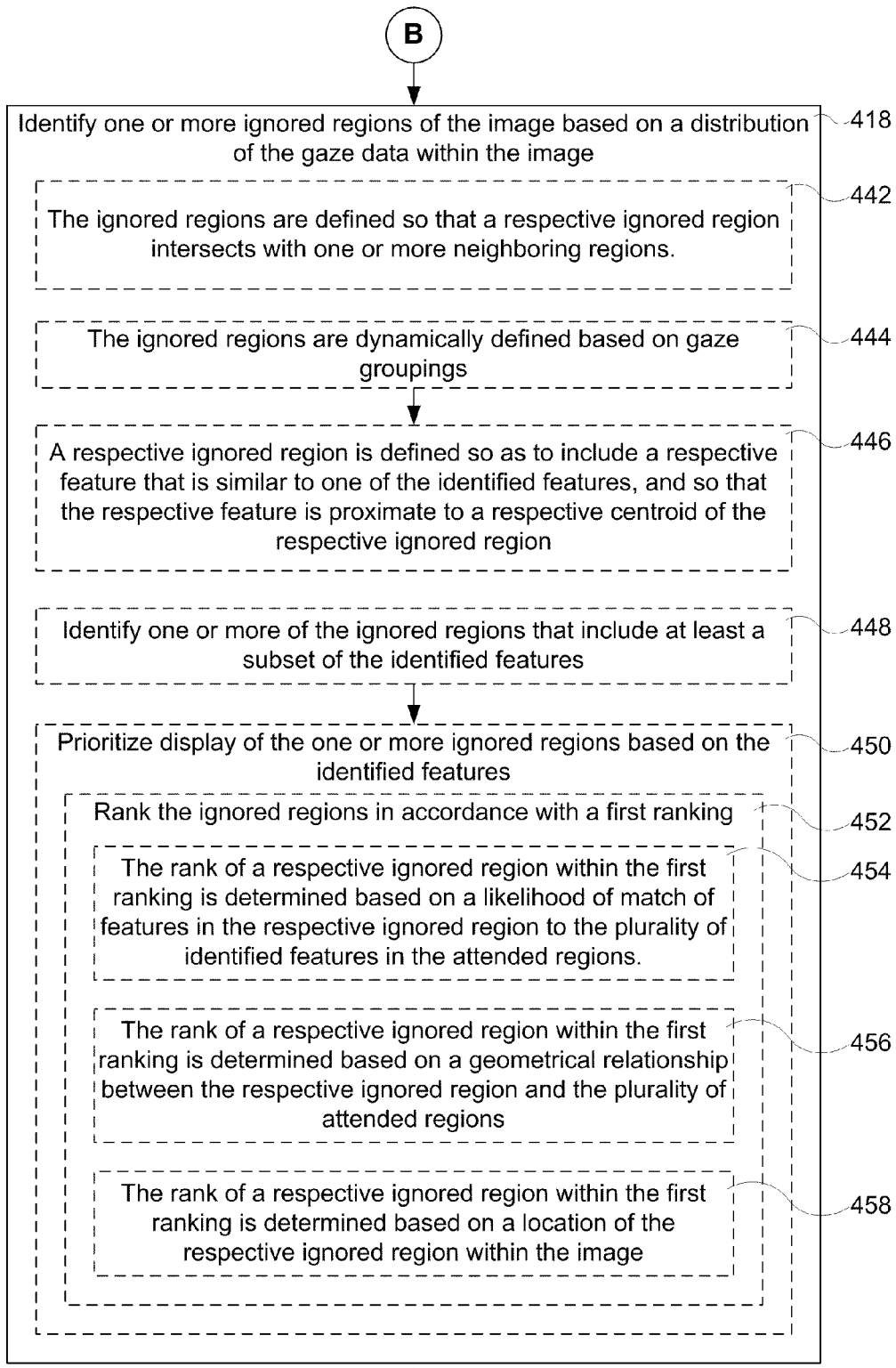
Figure 4D:
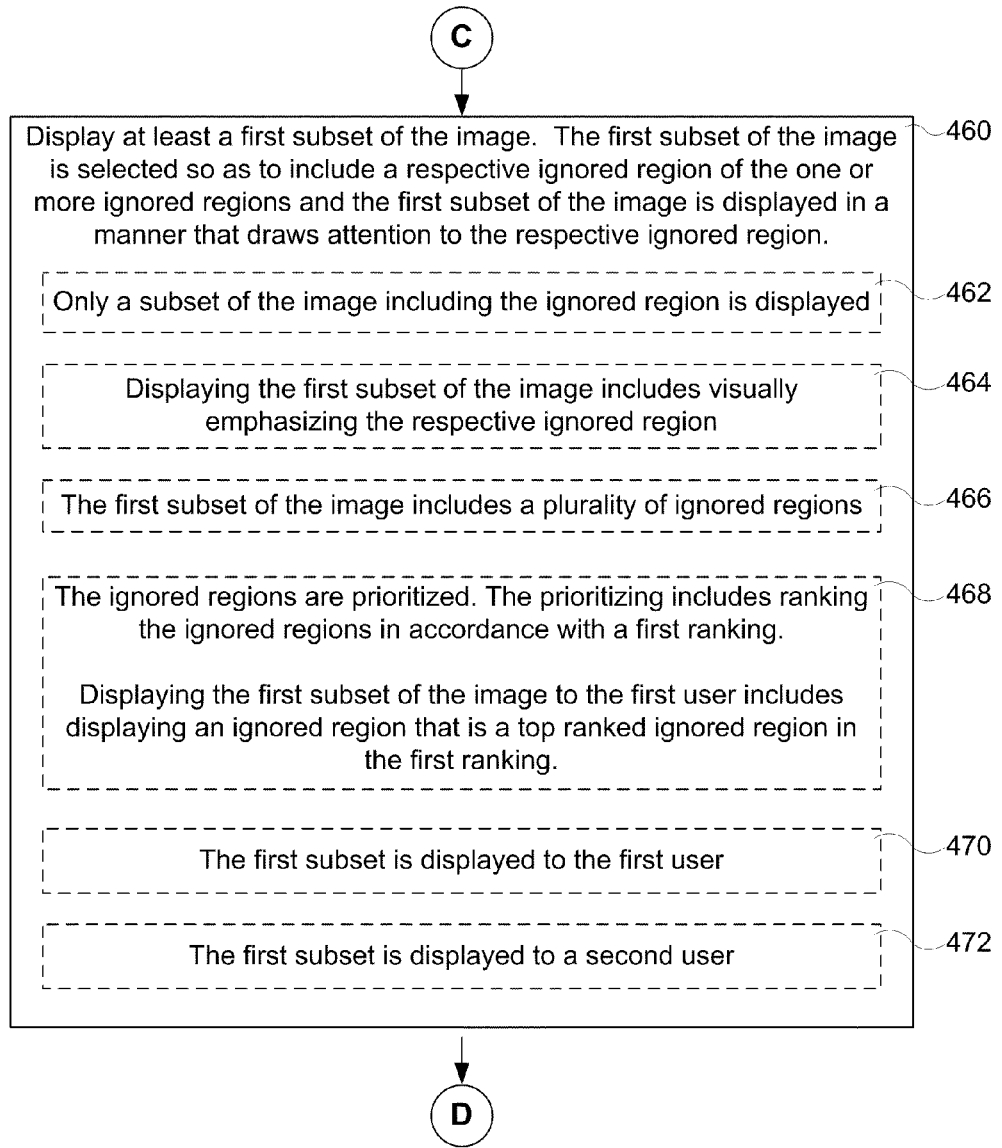
Figure 4E:
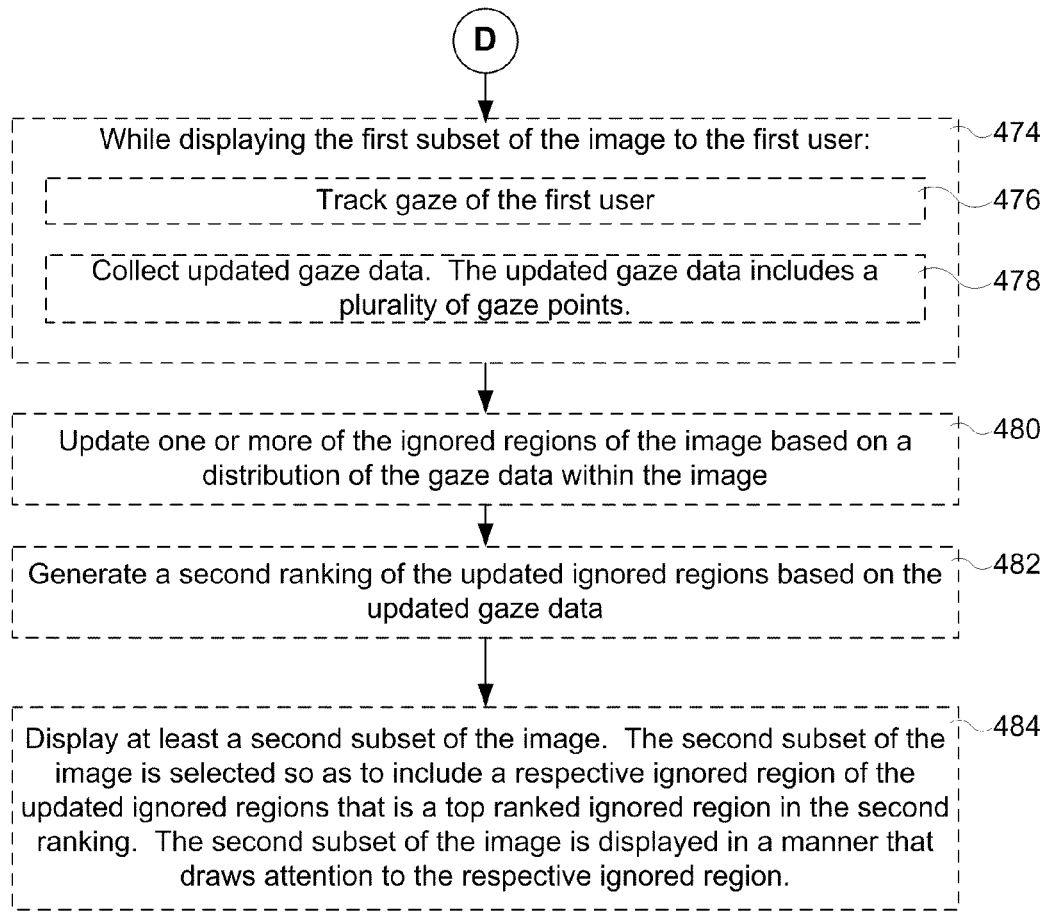
Figure 4F:
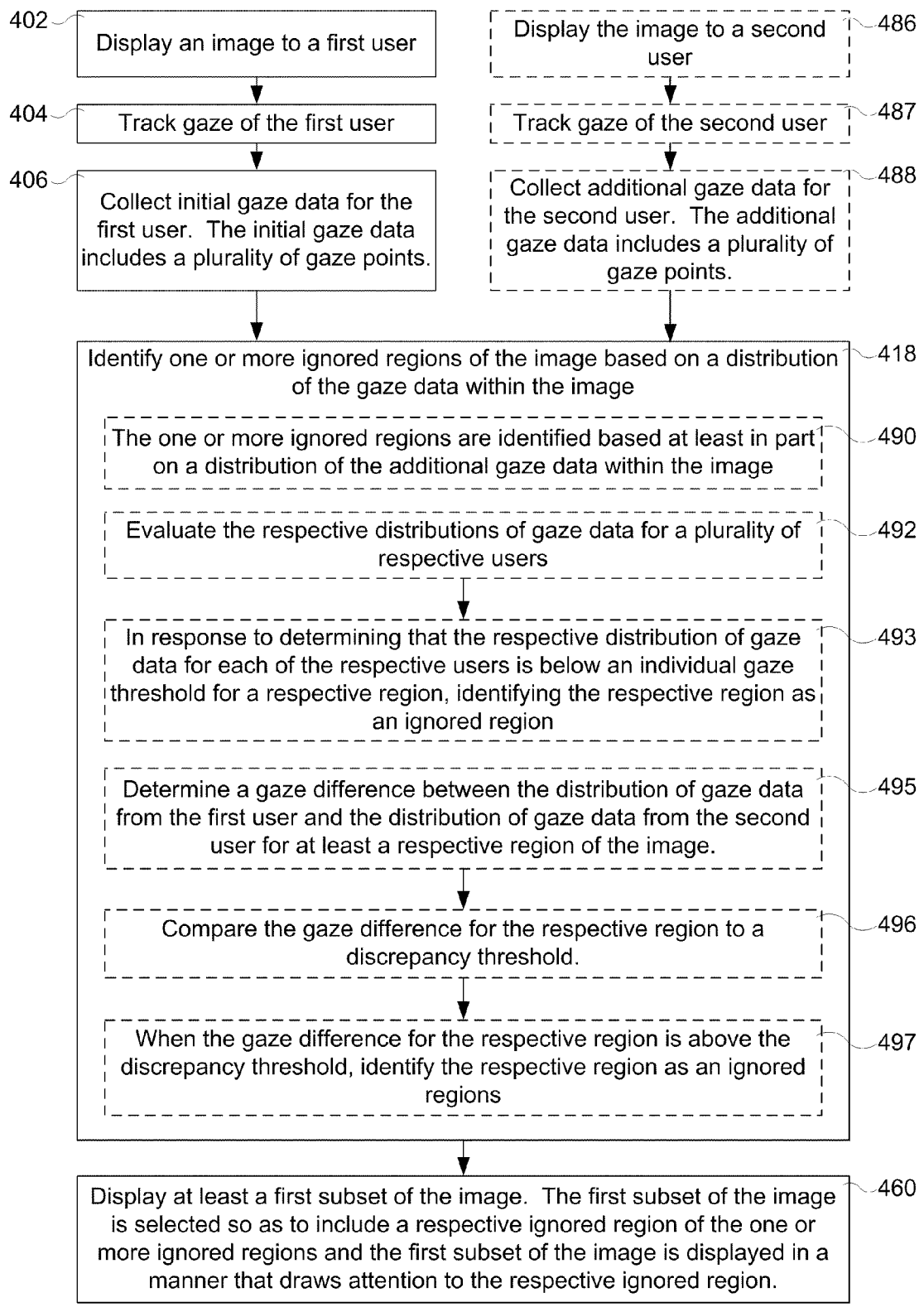

FIG. 3J illustrates a modified image 134-F that has been modified so as to visually emphasize a respective region (e.g., region 314-B-1 or region 314-B-2) of the plurality of regions 314-B. In this example, the respective region is emphasized by displaying only the respective region 314-B-1. However, it should be understood that this is an illustrative example, and any method of highlighting one or more respective regions could be used without departing from the scope of the present system or method. Additionally, while the attended regions of the image (e.g., 308-B in FIG. 3H) have been blocked from display in the respective regions (e.g., regions 314-B-1 and 314-B-2) in this example, it should be understood that, in some embodiments the attended regions are not blocked, and the entire region (e.g., region 314-B-1 or region 314-B-2) is displayed.

Attention is now directed towards FIGS. 4A-4F, which include a description of the method of detecting ignored regions and displaying at least a subset of the image so as to draw attention to one or more of the ignored regions in accordance with some embodiments.

The image analysis system 106 displays (402) an image to a first user (e.g., as illustrated in FIG. 3A). The image analysis system 106 tracks (404) gaze of the first user (e.g., using the gaze tracker 106 in FIGS. 1-2). The image analysis system 106 collects (406) initial gaze data for the first user, where the initial gaze data includes a plurality of gaze points (e.g., gaze points 304, as illustrated in FIG. 3B).

In some embodiments, the image analysis system 106 identifies (408), based on the initial gaze data, a plurality of attended regions. As one example, as illustrated in FIG. 3C, the image analysis system 106 groups the gaze points (e.g., 304 in FIG. 3B) into a plurality of gaze groups (e.g., 306-A in FIG. 3C or 306-B in FIG. 3E) and determines that regions of the image with gaze density above a predefined threshold are attended regions (e.g., the image analysis system determines that regions 308-A in FIG. 3D or regions 308-B in FIG. 3F are regions that have been looked at by the user more than a threshold amount). In other words, when the image analysis system 106 detects that the user has looked at a particular region sufficiently closely, the image analysis system 106 determines that region has been attended by the user.

In these embodiments, the attended regions include distributions of gaze data above a threshold. In some embodiments, the image analysis system 106 identifies (410) a plurality of features that are common to one or more of the attended regions. In some embodiments, the features are (412) characteristics (e.g., colors, textures, etc.) of the region as a whole. In some embodiments, the features are (414) elements within the region (e.g., shapes, textured areas, etc.). As one example, in the image in FIGS. 3A-3J, the image analysis system 106 may determine, based on the features in the attended regions (e.g., the shapes in the attended regions associated with gaze groupings 306 in FIG. 3C or FIG. 3E), that the user is primarily interested in features that only include straight edges. As discussed in greater detail below, in some embodiments, the identified features are used to determine which ignored regions of the image may be of particular relevance to the user, and to prioritize display of the ignored regions accordingly (e.g., ignored regions having more features with straight edges will be prioritized over ignored regions having fewer features with straight edges).

In some embodiments the features are identified (416) using predetermined feature identification parameters. As one example, the image analysis system 106 uses one or more image classifiers to supply feature identification parameters. In some embodiments, the features are domain specific (e.g., if the image analysis system 106 is used for welding examination the image analysis system 106 uses a first set of feature identification parameters, while if the image analysis system 106 is used for or orthopedic analysis the image analysis system 106 uses a second set of feature identification parameters, while if the image analysis system 106 is used for tumor detection in x-rays the device uses a third set of feature identification parameters). In other words, in some embodiments, a domain specific image classifier is used to identify relevant features within the images.

In some embodiments, the device identifies features from multiple images where there is a sequence of images that were reviewed as part of a plurality of related image analysis tasks (e.g., image analysis tasks in which similar features were being detected and consequently where the gaze was likely directed to similar features). In other words, in some embodiments, the image analysis task includes reviewing a plurality of images sequentially. For example, a radiologist may review a large number of x-ray images in a single session. In this example, for this viewing session (or for all viewing sessions related to a single image analysis task) the image analysis system 106 stores information about features in the regions that were attended by the user, and can use this information to update the identified set of features that are of interest to the user. Similarly, the identified set of features can be updated as the user is shown successive subsets of a single image, thereby improving the accuracy of the identified features over the course of the analysis of a single image.

Additionally, in some embodiments, the user specifically identifies features of interest to the image analysis system 106. For example, the user may use a cursor or other input device to select a region of the image on the display, thereby indicating to the image analysis system 106 that features within the region are of particular interest to the user.

The image analysis system 106 identifies (418) one or more ignored regions of the image based on a distribution of the gaze data within the image. In some embodiments, an ignored region is a region that includes an insufficient quantity of gaze. As one example, the ignored regions are predefined regions that include a total number of gaze points within the region is below a predefined threshold (e.g., in this embodiment, ignored region 314-A-1 in FIG. 3H is displayed because it includes fewer gaze points than a number of gaze points). As another example, the ignored regions are dynamically defined regions that exclude portions of the image that have been fixated on by the user for a duration threshold (e.g., in this embodiment, ignored region 314-A-1 in FIG. 3H is displayed because it includes gaze fixations with a duration below a time threshold)

In some embodiments thresholds are used for determining ignored regions, for detecting fixations and for grouping gaze data, as described in greater detail above. In some embodiments, the threshold (e.g., numbers of gaze points, e.g., 17 gaze points within a region, or duration, e.g. 275 milliseconds of total duration of fixations within a region) is a predefined threshold. The magnitude of a predefined threshold is determined based on factors such as the estimated duration of gaze that is necessary to indicate higher-level cognitive processes for particular image recognition tasks and/or the update frequency the gaze tracker (e.g., the rate at which gaze data is collected). In some embodiments, the threshold is dynamically determined based on inputs received at the image analysis system 106 or user preferences. In some embodiments, dynamic thresholds are user-specific thresholds. As one example, the allowed spatial dispersion within a fixation is determined dynamically based on one or more dispersion metrics that measure the distribution of distance between consecutive gaze points within the collected gaze data of the user. Typically, the dispersion metric is higher than a predefined normal value when the gaze tracker has a hard time tracking gaze of the user due to lighting conditions, physiological characteristics of the eye etc, and therefore gaze points contains more error. In contrast, the dispersion metric is at a predefined normal value when the gaze tracker operates during optimal conditions. In some embodiments, the dispersion metric is determined based on the distribution of distance between two consecutive gaze points. In other words, as level of noise in the gaze data increases, the dynamic threshold changes so as to more accurately identify fixations within the gaze data.

In some embodiments, identifying the one or more ignored regions includes defining (420) a plurality of gaze groupings (e.g., groupings 306-A in FIG. 3C or groupings 306-B in FIG. 3E) of the gaze data. In these embodiments, each gaze grouping includes one or more of the gaze points (e.g., 304 in FIGS. 3C and 3E), and has a respective location within the image. In some embodiments, the gaze data is detected at a predefined frequency (e.g., at a rate of 60 Hertz), and the grouping has a duration that is based on the number of gaze points within the gaze grouping, or the total duration (e.g., 500 milliseconds) of the fixations (e.g., fixations 312 in FIG. 3E) within the grouping. It should be understood that, in accordance with some embodiments, ignored regions are the inverse of attended regions. In other words, in some embodiments, the attended regions are determined first and the ignored regions are defined as regions outside of the attended regions. In some embodiments, the portions of the image that are outside of the attended regions are of appropriate size and are designated as ignored regions. In some embodiments, the portions of the image that are outside of the attended regions are either too small or too large and these portions are subsequently subdivided into smaller regions which are designated as ignored regions or these portions are merged into larger regions which are designated as ignored regions.

In some embodiments, the image analysis system 106 defines a respective gaze grouping by identifying (422) a subset of the gaze points that are proximate to each other; and defines (424) a region that includes the plurality of gaze points as the respective gaze grouping. For example, as illustrated in FIG. 3C, the image analysis system 106 identifies a subset of the gaze points in the upper left corner of the image, and defines a gaze grouping 306-A-1 that includes the subset of the gaze points 304. Similarly, in this example, the image analysis system 106 identifies other subsets of the gaze points as other gaze groupings (e.g., groupings 306-A-2 and 306-A-3 in FIG. 3C).

In some embodiments, the image analysis system 106 defines a respective gaze grouping by defining (426) a plurality of gaze fixations; and combining (428) a respective gaze fixation with one or more overlapping gaze fixations to define the respective gaze grouping. For example, in FIG. 3E, the image analysis system 106 detects a plurality of gaze fixations 312, and combines a plurality of the gaze fixations that are overlapping so as to define a respective gaze grouping 306-B-3.

In some embodiments, each gaze fixation has a centroid and a predefined shape. The "centroid" is the estimated fixation point. The shape is only needed for illustrating what the eye possibly saw when resting at the fixation point. For example, typically the shape of a fixation is circular since the fovea (i.e., the region of the eye that is responsible for sharp central vision) of the eye is round. It should be understood that, in accordance with some embodiments, fixations only include gaze points that are temporally consecutive within the gaze data over a time window of at least 100. In some embodiments, a duration of the fixation is an amount of time between the timestamp of the earliest gaze point in the fixation to a timestamp of the latest gaze point. It should also be understood that, in some embodiments fixations exclude gaze points that are outliers so as to correct for errors in the gaze tracking hardware/software.

Additionally, one skilled in the art would readily understand that fixations can be detected based on gaze data using a wide variety of methodologies. For brevity, all possible variations of detecting fixations are not described herein. Additional methodologies and approaches for detecting fixations including more details about detecting fixations based on the above dispersion-based fixation detection algorithm are described in greater detail in Salvucci and Goldberg "Identifying fixations and saccades in eye-tracking protocols." In Proceedings of the Eye. Tracking Research and Applications Symposium (pp. 71-78, 2004), which is hereby incorporated by reference in its entirety.

As described above, in some embodiments, fixations are combined into gaze groupings based on whether the fixations overlap. In some embodiments, fixations are combined using a minimum-spanning tree algorithm. Additionally, one skilled in the art would readily understand that other methods could be used to determine gaze groupings from a plurality of gaze fixations without departing from the scope of the presently system and method.

In some embodiments, after defining the plurality of gaze groupings, the image analysis system 106 identifies (430) the one or more ignored regions based on the respective locations of the plurality of gaze groupings (e.g., as illustrated in FIG. 3I, the ignored regions 314-B are identified as regions that are in between the attended regions 308-B). In some embodiments, identifying the one or more ignored regions based on the respective locations of the plurality of gaze groupings includes identifying (432) regions of the image that do not include any gaze groupings with a combined fixation duration above a threshold. For example, in FIGS. 3I-3J, the image analysis system 106 detects a region 314-B-1 that does not include any gaze groupings above the threshold (e.g., region 314-B-1 does not include groupings with a total fixation duration over 275 milliseconds). It should be understood that not all of the fixations in a gaze grouping need be sequential. In other words, in some embodiments, a user can examine a first region of the image, switch to examining a second region of the image and switch back to examining the first region of the image and all of the fixations within the first region will be grouped as a single gaze grouping.

In some other embodiments, identifying the one or more ignored regions based on the respective locations of the plurality of gaze groupings includes identifying (434) regions of the image that do not include gaze groupings with a number of gaze points above a threshold. For example, in FIGS. 3G-3H, the ignored region 314-A-1 does not include at least a threshold number of gaze points (e.g., 16 gaze points for a 275 ms threshold or 100 gaze points for a 1600 ms threshold). It should be understood that, in accordance with some embodiments, the threshold is determined based on a level of difficulty of the task. As one example, with gaze points being sampled at 60 Hz, for an easy task the threshold would be set near 500 ms, while for a harder task the threshold would be set near 1000 ms.

In some embodiments, the image is divided into a plurality of predetermined regularly spaced regions (e.g., regions 314-A in FIG. 3G) and the ignored regions (e.g., 314-A-1 in FIG. 3H) are (436) respective ones of the predetermined regularly spaced regions that include distributions of gaze data below a threshold. In some embodiments, a region has a distribution of gaze data below a threshold if the region includes a number of gaze points below a numerical threshold. In some embodiments, a region has a distribution of gaze data below a threshold if a region includes fixations with an aggregate duration below a duration threshold. In some embodiments, the threshold is a predefined threshold. In some embodiments, the threshold is a dynamic threshold, as described in greater detail above.

In some embodiments, the image analysis system 106 defines (438) a plurality of gaze groupings of the gaze data, where each gaze grouping includes one or more of the gaze points, and has a respective location within the image. For example, in FIG. 3C a plurality of gaze groupings 306 are defined based on the gaze data (e.g., gaze points 304). In these embodiments, the one or more ignored regions are identified (440) based on the respective locations of the plurality of gaze groupings, and the ignored regions are dynamically defined based on the gaze groupings and are defined so as to be non-overlapping regions that include distributions of gaze data below a threshold. For example, in FIG. 3D the attended regions 308-A correspond to the locations of the gaze groupings 306-A in FIG. 3C. The spaces in between these attended regions 308-A define ignored regions (e.g., regions 310-A in FIG. 3D). As one example, as illustrated in FIG. 3D, the ignored regions 310-A are non-overlapping rectangular regions that include distribution of gaze data below a predefined threshold. It should be understood that in other embodiments the ignored regions are defined so as to enclose regions of the image that are in between the attended regions of the image, as described in greater detail above with reference to FIGS. 3I-3J. Similarly, in other embodiments, the ignored regions are defined so as to enclose regions of the image that are arranged in a regular pattern or grid as described in greater detail above with reference to FIGS. 3G-3H.

In some embodiments, the ignored regions are defined (442) so that a respective ignored region intersects with one or more neighboring regions. In other words, in some embodiments, the regions are defined such that they slightly overlap so as to prevent the boundaries of the regions from cutting through important features (e.g., features that are automatically identified by the image analysis system 106 as being important). The amount of overlap can be determined by image characteristics, such as the size and density of features. For example, as described in greater detail above, in some embodiments, the image analysis system 106 uses the gaze data to identify important features within the attended regions. In some embodiments, the image analysis system 106 compares these identified important features with other features in the ignored regions, and draws the boundaries of the ignored regions so that they do not pass through any of the important features in the ignored regions. In these embodiments, the boundaries of ignored regions are defined so as to overlap each other slightly, so as to provide full coverage of the features in the ignored regions of the image while ensuring that the identified features are not divided between multiple regions where they would be difficult for the user to identify.

In some embodiments, the ignored regions are dynamically defined (444) based on gaze groupings. In these embodiments, a respective ignored region is defined (446) so as to include a respective feature that is similar to one of the identified features, and so that the respective feature is proximate to a respective centroid of the respective ignored region. In other words, the respective ignored region is defined so as to draw the user's attention to the identified feature by placing it in the center of an ignored region. In other words, instead of merely preventing the important features in the ignored regions from being divided between multiple regions, the image analysis system 106 actively defines the ignored regions so as to include the identified feature in the center of the ignored region. By placing the identified feature in the center of the ignored region, the user is more likely to carefully examine the identified feature, and thus more likely to accurately evaluate the importance of the identified feature.

In some embodiments, the image analysis system 106 identifies (448) one or more of the ignored regions that include at least a subset of the identified features. In these embodiments, the image analysis system 106 prioritizes (450) display of the one or more ignored regions based on the identified features. It should be understood that, in some embodiments, the one or more ignored regions are displayed based on the prioritization (e.g., displaying a first ranked region and subsequently displaying a second ranked region, a third ranked region, etc.).

In some embodiments, the prioritizing includes ranking (452) the ignored regions in accordance with a first ranking.

In some embodiments, the rank of a respective ignored region within the first ranking is determined (454) based on a likelihood of match of features in the respective ignored region to the plurality of identified features in the attended regions. As one example of ranking ignored regions based on a likelihood of match of features in the ignored to the identified features in the attended regions, ignored regions are prioritized based on the number of important features that are identified within the ignored region (e.g., if a first region 314-B-1 in FIG. 3J includes four shapes with characteristics of shapes that the user has examined in the image, and a second region 314-B-2 includes only two shapes with characteristics of shapes that the user has examined in the image, display of the first region 314-B-1 will be prioritized over display of the second region 314-B-2 by the image analysis system 106.

In some embodiments, the rank of a respective ignored region within the first ranking is determined (456) based on a geometrical relationship between the respective ignored region and the plurality of attended regions. In some embodiments, the rank of a respective ignored region within the first ranking is determined (458) based on a location of the respective ignored region within the image. As one example of ranking regions based on geometrical ranking criterion, the ignored regions are ranked based on a "reading direction" (e.g., left to right top to bottom). As another example of ranking regions based on geometrical relationships, the ignored regions are ranked based on size (e.g., showing larger regions before smaller regions). Furthermore, it should be understood that one or more of these various ranking schemes can be combined with each other or with other raking schemes.

The image analysis system 106 displays (460) at least a first subset of the image. The first subset of the image is selected so as to include a respective ignored region of the one or more ignored regions and the first subset of the image is displayed in a manner that draws attention to the respective ignored region. For example, in FIG. 3H, the entire image is displayed with a respective subset 314-A-1 emphasized by including a dark border around the respective region 314-A-1 and slightly fading (e.g., by decreasing the contrast and brightness) the rest of the image. In contrast, in FIG. 3J, only a subset of the image is displayed (e.g., a first ignored region 314-B-1 and/or a second ignored region 314-B-2).

In some embodiments, displaying a subset of the image in a manner that draws attention to the respective ignored region includes either: (A) displaying the whole image and emphasizing the ignored portion within the image (e.g., as illustrated in FIG. 3H); or (B) displaying a portion of the image that includes the ignored region (e.g., as illustrated in FIG. 3J). In other words, the image analysis system 106 performs an operation selected from the set consisting of: displaying a first subset of the image to the first user, wherein the first subset includes an ignored region; and, displaying at least the first subset of the image to the first user, wherein the first subset of the image is selected so as to include at least one of the ignored regions and at least one of the included ignored regions is emphasized.

In some embodiments, only a subset of the image including the ignored region is displayed (462). For example, in FIG. 3J, either a first ignored region 314-B-1 or a second ignored region 314-B-2 are displayed, or both. However, at least a subset of the original image is masked off and is not displayed to the user. Similarly, it should be understood that, in some embodiments, the entire image is displayed to the user with the attended regions masked off (e.g., the modified image 134-E in FIG. 3I is displayed to the user, where the attended regions 308-B are blocked). Blocking the attended regions of the image enables the user to more easily focus attention on regions of the image that have not previously been viewed sufficiently, thereby improving the thoroughness of the user's analysis of the image.

In some embodiments, displaying the first subset of the image includes visually emphasizing (464) the respective ignored region (e.g., as illustrated in FIG. 3H, the ignored region 314-A-1 is visually emphasized by fading the other regions of the image). For example, the visual emphasis could include adjusting (e.g., increasing, decreasing or otherwise shifting) one or more of the color, shading, hue, saturation, size, brightness, contrast border, of the ignored region so as to visually distinguish the ignored region from the rest of the image.

In some embodiments, the first subset of the image includes (466) a plurality of ignored regions. For example, in some embodiments two or more ignored regions are simultaneously displayed (e.g., in FIG. 3J, a first ignored region 314-B-1 and a second ignored region 314-B-2 are simultaneously displayed). In some embodiments, the number of ignored regions that are simultaneously displayed depends on the size of the ignored regions. For example, in some embodiments a maximum viewable area is determined (e.g., five degrees of viewable area for the user), and ignored regions are sequentially selected for simultaneous display to the user one at a time in rank order until selecting a next ignored region in the ranking would result in the selected ignored regions having a total area exceeding the maximum viewable area. In some embodiments, the ignored regions are also defined so as not to individually exceed the maximum viewable area. It should be understood that, under these conditions, in some circumstances (e.g., depending on the size of the ignored regions) only a single region would be displayed, while in other circumstances three or more regions would be simultaneously displayed. In some embodiments the maximum viewable area is defined based on the physical characteristics of the human eye (e.g., the maximum viewable area is a maximum area that can be seen in detail by an average human eye without moving or refocusing the eye). In some embodiments the minimum viewable area is defined based on characteristics of features in the image (e.g. the minimum viewable area is determined by the maximum size of a feature, so that features would be viewed in full within a region having a size greater than or equal to that of the minimum viewable area).

Using a maximum viewable area to determine how many regions should be displayed to the user at once is advantageous, because it provides an upward limit on the amount of information that is simultaneously presented to the user, while also reducing the number of iterations that a the image analysis system 106 must perform to display all of the ignored regions to the user by allowing the simultaneous display of a plurality of smaller regions. Consequently, the efficiency of the image analysis is improved while maintaining the beneficial effects of the structured image analysis described herein.

In some embodiments (e.g., embodiments where the ignored regions are prioritized and the prioritizing includes ranking the ignored regions in accordance with a first ranking, as described in greater detail above), displaying the first subset of the image to the first user includes displaying (468) an ignored region that is a top ranked ignored region in the first ranking. For example, in FIG. 3H, a respective ignored region 314-A-1 is a top ranked ignored region and thus is displayed to the user. It should be understood that, while only a single top ranked ignored region is displayed in this example, in some embodiments, a plurality of the top ranked regions are shown simultaneously (e.g., as illustrated in FIG. 3J, a top ranked ignored region 314-B-1 and a second ranked ignored region 314-B-2 are displayed simultaneously). Likewise, in some embodiments a plurality of the top ranked regions are shown sequentially (e.g., without re-ranking the regions). For example, instead of being displayed simultaneously, as illustrated in FIG. 3J, the top ranked region 314-B-1 and the second ranked region 314-B-2 could be displayed sequentially (e.g., one after the other). In some embodiments, when a plurality of subsets are shown sequentially, each subset is shown at a respective location on the display that corresponds to a location of the subset within the image so as to provide the user with context as to the location of the subset within the image. In some embodiments, when a plurality of subsets are shown sequentially, each subset is shown at a predefined location on the display (e.g., in the center of the display).

In some embodiments, the first subset is displayed (470) to the first user (e.g., the modified image is displayed to the same user as the original image). In some embodiments, the first subset is displayed (472) to a second user (e.g., the modified image is displayed to a different user as the original image). In some embodiments the first subset is displayed to one or more other users (e.g., the modified image is displayed to both the first user and the second user).

In some of the embodiments where the first subset is displayed to the first user, while displaying (474) the first subset of the image to the first user: the image analysis system 106 tracks (476) gaze of the first user; and collects (478) updated gaze data. The updated gaze data includes a plurality of gaze points. In these embodiments, the image analysis system 106 updates (480) one or more of the ignored regions of the image based on a distribution of the gaze data within the image. In some embodiments the updated gaze data is used by the image analysis system 106 to identify important features in the attended regions and subsequently use the identified important features to identify features of the ignored regions that match the identified important features. For example, if the new attended regions include a new type of feature, the image analysis system 106 will look for features in the ignored regions that are similar to the newly identified type of feature. In some embodiments, the image analysis system 106 generates (482) a second ranking of the updated ignored regions based on the updated gaze data. In some of these embodiments, the second ranking is also based at least in part on the initial gaze data. In these embodiments, the image analysis system 106 displays (484) at least a second subset of the image, wherein the second subset of the image is selected so as to include a respective ignored region of the updated ignored regions that is a top ranked ignored region in the second ranking, and the second subset of the image is displayed in a manner that draws attention to the respective ignored region.

In other words, in some embodiments, while displaying the modified image to the user, the image analysis system 106 collects more gaze data from the user and uses that gaze data to adjust the previously determined ignored regions. For example, previously ignored regions which now include distributions of gaze data that are above the threshold cease to be ignored regions. Likewise, in some embodiments, portions of ignored regions that include distributions of gaze data above the threshold are identified as attended regions, while the remainder of the ignored region remains an ignored region. In embodiments where the ignored regions are dynamically defined, the updated gaze data may cause one or more of the ignored regions to be redefined. In some embodiments, as described in greater detail above, the updated gaze data is also used by the image analysis system 106 to identify important features in the attended regions and subsequently use the identified important features to identify features of the ignored regions that match the identified important features. In some embodiments, the identified features of the ignored regions are also used to update the ranking of the ignored regions.

In some embodiments, in addition to displaying the image to the first user (402), tracking (404) gaze of the first user, and collecting (406) initial gaze data for the first user, as described in greater detail above, the image analysis system 106 also displays (486) the image to a second user; tracks (487) gaze of the second user; and collects (488) additional gaze data for the second user. In some embodiments, the additional gaze data includes a plurality of gaze points. In other words, gaze data for multiple users is collected for the same image. In some embodiments, this gaze data is collected and processed as described above in greater detail with reference to FIGS. 3A-3J.

In some of these embodiments, identifying (418) the one or more ignored regions of the image based on a distribution of the gaze data (e.g., including the gaze data from the first user and the gaze data from the second user) within the image includes performing one or more of operations 490-497. In some embodiments, identifying the one or more ignored regions of the image includes comparing gaze data from the first user and the second user. In some embodiments, the one or more ignored regions are identified (490) based at least in part on a distribution of the additional gaze data within the image (e.g., in this embodiment, the ignored regions 314-B in FIG. 3J are determined based on gaze groupings of gaze data for the first user and gaze groupings of gaze data for the second user). It should be understood that the plurality of gaze points that make up the additional gaze data are distinct from the plurality of gaze points that make up the initial gaze data. In other words, gaze points for the first user and gaze points for the second user are not mixed. This segregation of gaze points based on the user to which they are attributed is advantageous in many situations because it prevents the accidental designation of a region as an attended region when multiple users have distributions of gaze data (e.g., gaze points) within a region, but none of the users has actually examined the region carefully. If gaze data is not segregated, such a region may appear to have been attended (e.g., due to a high density of gaze points), when in fact the region has not actually been evaluated with sufficiently thoroughly.

In some embodiments, the image analysis system 106 identifies the one or more ignored regions by evaluating (492) the respective distributions of gaze data for a plurality of respective users (e.g., for each respective user the image analysis system 106 determines gaze grouping from raw gaze data or from fixations that were determined based on the raw gaze data for the respective user). In these embodiments, in response to determining that the respective distribution of gaze data for each of the respective users is below an individual gaze threshold for a respective region, the image analysis system 106 identifies (493) the respective region as an ignored region. In other words, in these embodiments, users are working together to analyze the image as a whole, from the perspective of the image analysis system 106, it does not matter which user has examined a respective region of the image, so long as the respective region of the image has been examined carefully by at least one of the users. These embodiments are particularly advantageous for performing an image analysis task quickly, because the efforts of the users are cumulative, and consequently in most circumstances (e.g., where the distribution of gaze data for the first user is different from the distribution of gaze data for the second user) there will be fewer ignored regions and two users will be able to more quickly review the ignored regions when the modified image is displayed to the users.

In some embodiments, the image analysis system 106 identifies one or more ignored regions by determining (495) a gaze difference between the distribution of gaze data from the first user and the distribution of gaze data from the second user for at least a respective region of the image. In these embodiments, the image analysis system 106 compares (496) the gaze difference for the respective region to a discrepancy threshold. For example a discrepancy threshold could include a difference between a number of gaze points in a respective region for the first user and the second user or a difference in gaze duration between the sum of durations for fixations in the region for the first user and the sum of durations for fixations in the region for the second user. In other words, the discrepancy threshold is a measure of the difference between the amount of attention paid by the first user to a respective region and the amount of attention paid by the second user to the respective region. In these embodiments, when the gaze difference for the respective region is above the discrepancy threshold, the image analysis system 106 identifies (497) the respective region as an ignored regions. In some embodiments, regions that are ignored by both users are not identified as ignored regions (e.g., because they have essentially been separately evaluated by two separate users and neither user has indicated that the region is important). In some embodiments, regions that are ignored by both users are ranked lower than regions with a high discrepancy threshold. In other words, in embodiments where ignored regions are prioritized for display by ranking the ignored regions in accordance with a first ranking, regions that are ignored by the first user and attended by the second user are ranked higher than regions that are ignored by both users.

In other words, in these embodiments, when a first user objectively indicates that a respective region is of interest while the second user ignores the respective region, the image analysis system 106 identifies the discrepancy between the users and redisplays the respective region to at least the user who ignored the respective region. In some of these embodiments, the ignored regions are redisplayed to both users. These embodiments are particularly advantageous for performing an image analysis task accurately, because the first user and the second user essentially double check the image, and consequently there will be fewer overlooked regions that include relevant features. Moreover, regions that have a high level of discrepancy between the distributions of gaze between a first user and a second user are likely good candidates for re-evaluation by one or both users, because the users are not in agreement as to the importance of features in such regions.

The steps in the information processing methods described above may be implemented by running one or more functional modules in information processing apparatus such as general purpose processors or application specific chips. These modules, combinations of these modules, and/or their combination with general hardware (e.g., as described above with respect to FIG. 2) are all included within the scope of protection of the invention.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method of enhancing image analysis comprising:
at a computer system having one or more processors and memory storing one or more programs that when executed by the one or more processors cause the computer system to perform the method, the method comprising:
displaying an image to a first user;
tracking gaze of the first user;
collecting initial gaze data for the first user, wherein the initial gaze data includes a plurality of gaze points;
identifying, based on the initial gaze data:
one or more attended regions, wherein the one or more attended regions include distributions of gaze data above a threshold; and
one or more attended image features in the one or more attended regions;
identifying one or more ignored regions of the image based on a distribution of the gaze data within the image, wherein ignored regions are regions outside of the one or more attended regions;
selecting a respective ignored region of the one or more ignored regions in accordance with the criteria that the respective ignored region includes a respective ignored image feature similar to one or more of the attended image features; and
displaying at least a first subset of the image in a manner that draws attention to the respective ignored region that includes the respective ignored image feature.

2. The method of claim 1, wherein only a subset of the image including the ignored region is displayed.

3. The method of claim 1, displaying the first subset of the image includes visually emphasizing the respective ignored region.

4. The method of claim 1, wherein the image is divided into a plurality of predetermined regularly spaced regions and the ignored regions are respective ones of the predetermined regularly spaced regions that include distributions of gaze data below a threshold.

5. The method of claim 1, further comprising:
defining a plurality of gaze groupings of the gaze data, wherein each gaze grouping includes one or more of the gaze points, and has a respective location within the image; and
identifying the one or more ignored regions based on the respective locations of the plurality of gaze groupings, wherein the ignored regions are dynamically defined based on the gaze groupings and are defined so as to be non-overlapping regions that include distributions of gaze data below the threshold.

6. The method of claim 1, wherein the ignored regions are defined so that a respective ignored region intersects with one or more neighboring regions.

7. The method of claim 1, wherein the first subset of the image includes a plurality of ignored regions.

8. The method of claim 1, wherein: the one or more ignored regions are dynamically defined based on gaze groupings; and, a respective ignored region is defined so as to include the respective ignored image feature proximate to a respective centroid of the respective ignored region.

9. The method of claim 1, further comprising:
displaying the image to a second user;
tracking gaze of the second user; and collecting additional gaze data for the second user, wherein the additional gaze data includes a plurality of gaze points;

wherein the one or more ignored regions are identified based at least in part on a distribution of the additional gaze data within the image.

10. The method of claim 9, wherein:

identifying the one or more ignored regions includes evaluating the respective distributions of gaze data for a plurality of respective users; and the method further comprises, in response to determining that the respective distribution of gaze data for each of the respective users is below an individual gaze threshold for a respective region, identifying the respective region as an ignored region.

11. The method of claim 9, wherein identifying one or more ignored regions includes:

determining a gaze difference between the distribution of gaze data from the first user and the distribution of gaze data from the second user for at least a respective region of the image;

comparing the gaze difference for the respective region to a discrepancy threshold; and when the gaze difference for the respective region is above the discrepancy threshold, identifying the respective region as an ignored regions.

12. The method of claim 1, wherein: identifying the one or more ignored regions includes:

defining a plurality of gaze groupings of the gaze data, wherein each gaze grouping includes one or more of the gaze points, and has a respective location within the image; and identifying the one or more ignored regions based on the respective locations of the plurality of gaze groupings.

13. The method of claim 12, wherein defining a respective gaze grouping includes:

identifying a subset of the gaze points that are proximate to each other; and defining a region that includes the plurality of gaze points as the respective gaze grouping.

14. The method of claim 12, wherein identifying the one or more ignored regions based on the respective locations of the plurality of gaze groupings includes identifying regions of the image that do not include gaze groupings with a number of gaze points above a threshold.

15. The method of claim 12, wherein defining a respective gaze grouping includes:

defining a plurality of gaze fixations; and combining a respective gaze fixation with one or more overlapping gaze fixations to define the respective gaze grouping.

16. The method of claim 15, wherein identifying the one or more ignored regions based on the respective locations of the plurality of gaze groupings includes identifying regions of the image that do not include gaze groupings with a combined fixation duration above a threshold.

17. The method of claim 1, further comprising:

identifying, based on the initial gaze data, a plurality of attended regions, wherein the attended regions include distributions of gaze data above the threshold; and identifying a plurality of attended image features that are common to one or more of the attended regions.

18. The method of claim 17, further comprising:

identifying one or more of the ignored regions that include ignored image features similar to at least a subset of the attended image features; and prioritizing display of the one or more ignored regions based on the attended image features.

19. The method of claim 18, wherein the prioritizing includes: ranking the ignored regions in accordance with a first ranking, and the rank of a respective ignored region within the first ranking is determined based on one or more criteria selected from the list consisting of:

a likelihood of match of ignored image features in the respective ignored region to the plurality of attended image features in the attended regions;

a geometrical relationship between the respective ignored region and the plurality of attended regions; and a location of the respective ignored region within the image.

20. The method of claim 18, wherein:

the prioritizing includes ranking the ignored regions in accordance with a first ranking; and displaying the first subset of the image to the first user includes displaying an ignored region that is a top ranked ignored region in the first ranking.

21. The method of claim 20, wherein the first subset is displayed to the first user, and the method further comprises:

while displaying the first subset of the image to the first user:

tracking gaze of the first user; and, collecting updated gaze data, wherein the updated gaze data includes a plurality of gaze points;

updating one or more of the ignored regions of the image based on a distribution of the gaze data within the image;

generating a second ranking of the updated ignored regions based on the updated gaze data; and, displaying at least a second subset of the image, wherein the second subset of the image is selected so as to include a respective ignored region of the updated ignored regions that is a top ranked ignored region in the second ranking, and the second subset of the image is displayed in a manner that draws attention to the respective ignored region of the updated ignored regions.

22. An image analysis system, comprising:

one or more processors;

memory; and one or more programs, wherein the one or more programs are stored in the memory and configured to be executed by the one or more processors, the one or more programs including instructions for:

displaying an image to a first user;

tracking gaze of the first user;

collecting initial gaze data for the first user, wherein the initial gaze data includes a plurality of gaze points;

identifying, based on the initial gaze data:

one or more attended regions, wherein the one or more attended regions include distributions of gaze data above a threshold; and one or more attended image features in the one or more attended regions;

identifying one or more ignored regions of the image based on a distribution of the gaze data within the image, wherein ignored regions are regions outside of the one or more attended regions;

selecting a respective ignored region of the one or more ignored regions in accordance with the criteria that the respective ignored region includes a respective ignored image feature similar to one or more of the attended image features; and displaying at least a first subset of the image in a manner that draws attention to the respective ignored region that includes the respective ignored image feature.

23. A non-transitory computer readable storage medium storing one or more programs, the one or more programs comprising instructions, which when executed by an image analysis system with memory and one or more processors, cause the image analysis system to:
- display an image to a first user;
- track gaze of the first user;
- collect initial gaze data for the first user, wherein the initial gaze data includes a plurality of gaze points;
- identify, based on the initial gaze data:
  - one or more attended regions, wherein the one or more attended regions include distributions of gaze data above a threshold; and
  - one or more attended image features in the one or more attended regions;
- identify one or more ignored regions of the image based on a distribution of the gaze data within the image, wherein ignored regions are regions outside of the one or more attended regions;
- select a respective ignored region of the one or more ignored regions in accordance with the criteria that the respective ignored region includes a respective ignored image feature similar to one or more of the attended image features; and
- display at least a first subset of the image in a manner that draws attention to the respective ignored region that includes the respective ignored image feature.

* * * * *